United States Patent
Karmon et al.

(10) Patent No.: US 12,454,776 B2
(45) Date of Patent: *Oct. 28, 2025

(54) TOOL FOR DESIGN AND FABRICATION OF KNITTED COMPONENTS

(71) Applicant: NIKE, Inc., Beaverton, OR (US)

(72) Inventors: Ayelet Karmon, Tel Aviv (IL); Shoval Nir, Tel Aviv (IL); Tom Shaked, Tel Aviv (IL); Eyal Sheffer, Tel Aviv (IL); Yoav Sterman, Ramat Gan (IL)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,561

(22) Filed: Oct. 4, 2023

(65) Prior Publication Data

US 2024/0026582 A1 Jan. 25, 2024

Related U.S. Application Data

(63) Continuation of application No. 17/859,696, filed on Jul. 7, 2022, now Pat. No. 11,913,149, which is a continuation of application No. 16/441,498, filed on Jun. 14, 2019, now Pat. No. 11,421,355.

(60) Provisional application No. 62/685,701, filed on Jun. 15, 2018.

(51) Int. Cl.
*D04B 15/66* (2006.01)
*G06F 113/12* (2020.01)

(52) U.S. Cl.
CPC .... *D04B 15/66* (2013.01); *G05B 2219/45194* (2013.01); *G06F 2113/12* (2020.01)

(58) Field of Classification Search
CPC .................. A43B 1/04; G05B 2219/45194

USPC .......................................................... 700/141
See application file for complete search history.

(56) References Cited

U.S. PATENT DOCUMENTS

| | | | |
|---|---|---|---|
| 3,331,402 | A | 7/1967 | Josef et al. |
| 4,172,165 | A | 10/1979 | Kieckhefer et al. |
| 4,398,277 | A | 8/1983 | Christiansen et al. |
| 4,764,875 | A | 8/1988 | Carrotte et al. |
| 5,287,709 | A | 2/1994 | Seino et al. |

(Continued)

FOREIGN PATENT DOCUMENTS

| CN | 1780952 A | 5/2006 |
|---|---|---|
| CN | 102619016 A | 8/2012 |

(Continued)

OTHER PUBLICATIONS

Oct. 28, 2019—(WO) ISR & WO—App. No. PCT/US19/037212.
(Continued)

*Primary Examiner* — Grace Huang
(74) *Attorney, Agent, or Firm* — Banner & Witcoff, Ltd.

(57) ABSTRACT

Computer based systems and methods for designing and manufacturing consumer products, including knit footwear uppers, and the like. The system simulates deformations of knit structures and allows the user to control and visualize compensations in the structure(s) of the knitted component to better match between an intended knit design and the actual physical knitted component outcome. The system may modify a knit design of a knitted component to compensate for a predicted/estimated deformation behavior of the knitted component, for example, by duplicating one or more portions of a knit structure associated with the knit design.

17 Claims, 19 Drawing Sheets

(56) References Cited

U.S. PATENT DOCUMENTS

| | | | |
|---|---|---|---|
| 5,353,355 | A | 10/1994 | Takagi et al. |
| 5,431,030 | A | 7/1995 | Ishizaki et al. |
| 5,791,271 | A | 8/1998 | Futamura |
| 5,826,445 | A | 10/1998 | Okamoto |
| 6,138,482 | A | 10/2000 | Shima et al. |
| 6,314,582 | B1 | 11/2001 | Montague |
| 6,390,005 | B1 | 5/2002 | Chia et al. |
| 6,665,578 | B2 | 12/2003 | Ochi et al. |
| 6,720,058 | B1 | 4/2004 | Weeks et al. |
| 6,845,285 | B2 | 1/2005 | Kakimoto et al. |
| 6,899,591 | B2 | 5/2005 | Mitchell |
| 7,043,329 | B2 | 5/2006 | Dias et al. |
| 7,127,321 | B2 | 10/2006 | Kenji et al. |
| 7,169,011 | B2 | 1/2007 | Mitchell et al. |
| 7,272,462 | B2 | 9/2007 | Smedley et al. |
| 7,386,361 | B2 | 6/2008 | Nobuyuki et al. |
| 7,434,423 | B1 | 10/2008 | Reid, Jr. et al. |
| 7,643,898 | B2 | 1/2010 | Takeda et al. |
| 7,657,341 | B2 | 2/2010 | Lind |
| 8,000,829 | B2 | 8/2011 | Terai |
| 8,021,735 | B2 | 9/2011 | Tsiarkezos |
| 8,065,894 | B2 | 11/2011 | Yanagi et al. |
| 8,424,116 | B2 | 4/2013 | Anastsopoulos et al. |
| 8,655,474 | B2 | 2/2014 | Katano et al. |
| 8,851,001 | B2 | 10/2014 | Albano et al. |
| 8,958,902 | B2 * | 2/2015 | Levine .................. D04B 1/126 700/141 |
| 9,004,675 | B2 * | 4/2015 | Miller .................... B41F 17/38 347/106 |
| 9,495,736 | B2 | 11/2016 | Kawabata et al. |
| 9,538,794 | B2 | 1/2017 | Turlan |
| 9,551,095 | B2 | 1/2017 | Lee |
| 9,957,649 | B2 | 5/2018 | Liu |
| 10,053,804 | B2 | 8/2018 | Frantz et al. |
| 10,179,186 | B2 | 1/2019 | Moreland et al. |
| 10,252,875 | B2 | 4/2019 | Shoji et al. |
| 10,351,982 | B2 * | 7/2019 | deGuzman ......... G06Q 30/0621 |
| 10,508,372 | B2 | 12/2019 | Aylor et al. |
| 10,810,333 | B2 | 10/2020 | Cirio et al. |
| 11,058,532 | B2 | 7/2021 | Rocco et al. |
| 11,091,859 | B2 | 8/2021 | Fedner |
| 11,208,744 | B2 | 12/2021 | Urbelis |
| 11,293,124 | B2 | 4/2022 | Morgan et al. |
| 2007/0088453 | A1 | 4/2007 | Noriyuki |
| 2010/0145495 | A1 | 6/2010 | Terai |
| 2010/0235970 | A1 | 9/2010 | Rad |
| 2014/0311187 | A1 | 10/2014 | Amarasiriwardena et al. |
| 2015/0033448 | A1 | 2/2015 | Rad |
| 2016/0032508 | A1 | 2/2016 | Tokura |
| 2019/0262188 | A1 | 8/2019 | Reid, Jr. |
| 2019/0335831 | A1 | 11/2019 | Urbelis |
| 2019/0368084 | A1 | 12/2019 | Alun-Jones et al. |

FOREIGN PATENT DOCUMENTS

| | | | | |
|---|---|---|---|---|
| CN | 104928839 | A | 9/2015 | |
| CN | 106663134 | A | 5/2017 | |
| CN | 108140015 | A | 6/2018 | |
| CN | 112534091 | A | 3/2021 | |
| DE | 102017223750 | A1 | 6/2019 | |
| EP | 3763861 | A1 * | 1/2021 | ............ D04B 15/70 |
| JP | H0578960 | A | 3/1993 | |
| JP | 2015-175082 | A | 10/2015 | |
| WO | 2015200320 | A1 | 12/2015 | |
| WO | 2019241646 | A1 | 12/2019 | |

OTHER PUBLICATIONS

Anonymous: "ArahWeave 7.1 User's manual", Jun. 15, 2015 (Jun. 15, 2015), pp. 94-210, XP055622323, Retrieved from the Internet: URL: https://www.slideshare.net/Arahne/laweave-en [retrieved on Sep. 16, 2019] sections 8,8.1, 8.2, 8.3, 8.3.1, 8.3.2, 8.5; sections 16, 16.1, 16.9, 16.10, 19, 19.1, 19.2; the whole document; figures 197, 198, 194, 210, 211, 331, 332.

Gabriel Cirio et al: "Efficient simulation of knitted cloth using persistent contacts", Proceedings of the 14th ACM Siggraph / Eurographics Symposium on Computer Animation, SCA '15, Aug. 9, 2015 (Aug. 9, 2015), pp. 55-61, XP055558454, New York, New York, USA; DOI: 10.1145/2786784.2786801; ISBN: 978-1-4503-3496-9; title, abstract, figure 4, sections 4, 4.1, 4.2, 4.3, equations 1-3, the whole document.

Ayelet Karmon et al: "KNITIT: a computational tool for design, simulation, and fabrication of multiple structured knits", Proceedings of the 2nd ACM Symposium on Computational Fabrication, SCF '18, Jun. 19, 2018 (Jun. 19, 2018), pp. 1-10, XP055621755, New York, New York, USA; DOI: 10.1145/3213512.3213516; ISBN: 978-1-4503-5854-5; abstract, figures 1, 3, 9, 11, section 3.1; p. 3, col. 1, sections 4, 4.1, the whole document.

Color Expert Admin Color Expert, "Different Types of Raster Image File Formats and Their Features Explained," Color Experts International Inc., Feb. 1, 2018, www.colorexpertsbd.com/blog/different-types-raster-image-file-formats/, (Year 2018).

\* cited by examiner

402

TOOL FOR DESIGN AND FABRICATION OF KNITTED COMPONENTS

CROSS-REFERENCE TO RELATED APPLICATION

This application is a continuation of U.S. patent application Ser. No. 17/859,696 filed Jul. 7, 2022, which is a continuation of U.S. patent application Ser. No. 16/441,498 filed Jun. 14, 2019, now U.S. Pat. No. 11,421,355 issued Aug. 23, 2022, which claims the benefit of priority from U.S. Provisional Patent Application No. 62/685,701, entitled "Tool for Design and Fabrication of Knitted Components" filed Jun. 15, 2018. The contents of the aforementioned applications are hereby incorporated by reference in their entirety.

FIELD OF THE INVENTION

The technologies disclosed herein relate to systems and methods used to design knitted components. More particularly, the technologies disclosed relate to methods and systems for the customization and manufacturing of knitted components and complex knitted structures.

BACKGROUND OF THE INVENTION

Conventional articles of athletic footwear include two primary elements, an upper and a sole structure. The upper provides a covering for the foot that securely receives and positions the foot with respect to the sole structure. In addition, the upper may have a configuration that protects the foot and provides ventilation, thereby cooling the foot and removing perspiration. The sole structure is secured to a lower surface of the upper and is generally positioned between the foot and the ground. In addition to attenuating ground reaction forces and absorbing energy (i.e., imparting cushioning), the sole structure may provide traction and control potentially harmful foot motion, such as over pronation. Accordingly, the upper and the sole structure operate cooperatively to provide a comfortable structure that is suited for a wide variety of ambulatory activities, such as walking and running.

Various materials may be utilized in manufacturing the upper, as well as other knitted or woven products, such as articles of apparel and other wearable or non-wearable products. Some uppers are formed of knit material, such as thread and/or yarn. Knit uppers have appearances that differ from the appearances of uppers formed of other materials like leather, synthetic leather, and rubber. During the design and manufacturing of a knit upper it is common for a designer to create a design and then for one or more other people to program a knitting machine to manufacture the upper. The separation of parts of the design and manufacturing process can result in the development and manufacturing of several uppers before the designer approves a design that can be manufactured by a knitting machine. Multiple rounds or cycles of creating many knit uppers that don't meet a designer's view of the design imagined can be costly in time and resources.

Additionally, utilizing digital control tools for the customization of knitted fabrics may lead to fabrication challenges that inhibit the extent of use of digital customization for knitted products on a mass scale. Importantly, this issue is heightened when complex multiple structured knits are involved. Such issues may arise due, in part, to physical changes that occur in the overall dimensions of the knit/fabric, when stitch structures with different physical attributes are combined within the same fabric or knitted component. For example, the outline of the fabric is of specific importance as it is commonly preconfigured to a specific shape and dimension that must be reproducible, for example, a knitted footwear upper. Conventional knit design processes and computational tools fail to assist in the simulation and prediction of these knit/fabric deformations. As a result, conventional processes of manufacturing/fabricating knitted components/products typically rely on the manual efforts and knitting expertise of highly trained individuals who manually perform iterative testing to accurately fabricate knitted components devoid of deformations and other production issues.

Thus there is a need for a knitting system and computational parametric tool that may be used for digitally designing and industrially producing/manufacturing knitted components/products, thus creating a direct link between design and manufacturability. This link between design and manufacturability allows the designer/user to accurately estimate fabric deformation, and to control and visualize compensations in the fabric structure, thereby assisting the designer/user in the technical task of allocating knit structures to achieve a better matching between the initial graphic intent of the knit design and the actual physical knitted fabric outcome produced by knitting machines. Such an approach can drastically improve the design to manufacturing process in knit engineering, and reduce the number of iteration cycles for knitting material samples, especially when knitting highly varied designs, thereby improving the efficiency of the knitting machine and knit production, as well as reducing waste during the fabrication process.

SUMMARY OF THE INVENTION

One or more of the above-mentioned needs in the art are satisfied by the disclosed systems and methods for designing wearable and non-wearable products, including footwear uppers.

One or more aspects of the present disclosure focuses on the implementation of a digital customization system for knitted products. From a manufacturing point of view, the physical behavior of complex multiple structured knitted components/fabrics is a real challenge for realizing product individualization and customization on a mass scale. When making changes to the design of a knitted component, conventional knitting systems require a time-consuming and iterative approach to manufacturing knitted components and/or fabric samples, and then manually testing those samples to determine/identify potential deformations in the samples. Deformations may be represented by geometrical changes in a sample. For example, a sample may experience an increase or decrease in the length (in any direction) of a knitted section. Further, spatial deformations may represent a change in the 3D form of the structure, for example, an increase or decrease of the curvature of the knitted structure. Such deformations may occur due to a variety of factors including, among others, stitch structure, yarn characteristics, knitting density, and the like. This iterative process is typically required for each change made to the knit design pattern. This inefficient process is time-consuming, wasteful, costly, and laborious in that it requires the manual efforts of trained knitting experts to suitably re-program the knitting machine to perform each fabrication task. This conventional process also prevents the adoption of a more variegated manufacturing approach, which would provide designers or end users with enhanced flexibility in customizing their own knit designs. Furthermore, because of a coupling between the visual attributes of personalized knitted fabrics (e.g., color, shade, density, etc.) and their structural dynamics, as well as the way they interact with the human body, there is a heightened interest to enhance their fitting, thereby providing the end user with a more customized and tailored product. Accordingly, as explained further below, the better and more accurate a knitting system's ability to predict knitted fabric behavior, the more personalized the resulting knitted product can be made.

The global industry of textiles and knitted products could greatly benefit from improvement in flexibility of manufacturing, accuracy and speed. As noted above, from a product point of view, the manual data restructuring of files by knitting experts may result in loss of information and alteration of nuances in the knitted component. With this in mind, the system for digitally designing and producing knitted fabrics, as described herein, would increase efficiency within, and thus further improve, the fabrication/manufacturing processes of knitted products. As described in more detail below, the present knitting system implements a physical simulation to estimate deformation of a knitted component, thus allowing the designer (or end user) to dynamically add compensations and achieve a better prediction for the final knitted outcome and physical output of the knitting machine.

The knitting system described herein entails creating a library of knitted structures, as well as creating a comprehensive computational predictive model to compensate for deformations caused by different aspect ratio structure combinations within the knitted component/fabric. Data relating to the library of knitted structures may be obtained from a separate source and/or may be generated by the knitting system using an extensive testing process of numerous knitted samples and maintaining/storing the testing results in the library (or other suitable data storage) for future use. For example, each new knitted sample or knit design that is tested by the knitting system may further include an analysis of stitch combination and measurements of the physical knit behavior, and this information may be stored in the library of knitted structures for comparison to future knitted samples and the fabrication of different knit designs. Thus, once the system obtains data and parameters relating to a new knit structure and its deformation behavior, this information can be incorporated, by the knitting system, in future tests and knit manufacturing, thereby improving the automation and reliability of the computational too and knitting machine when fabricating any knit design.

In some aspects of this disclosure, the present technologies disclosed may be partially or wholly implemented with a computer-readable medium, for example, by storing computer-executable instructions or modules, or by utilizing computer-readable data structures. Of course, the methods and systems of the above-referenced embodiments may also include other additional elements, steps, computer-executable instructions, or computer-readable data structures.

The details of these and other embodiments of the present technologies disclosed are set forth in the accompanying drawings and the description below. Other features and advantages of the technologies disclosed will be apparent from the description and drawings, and from the claims.

BRIEF DESCRIPTION OF THE DRAWINGS

The present technologies disclosed are illustrated by way of example and not limited in the accompanying figures in which like reference numerals indicate similar elements and in which:

FIG. 5E illustrates example knitted structures of various knitted components, in accordance with one or more aspects of the present disclosure.

DETAILED DESCRIPTION OF THE INVENTION

Figure 1:
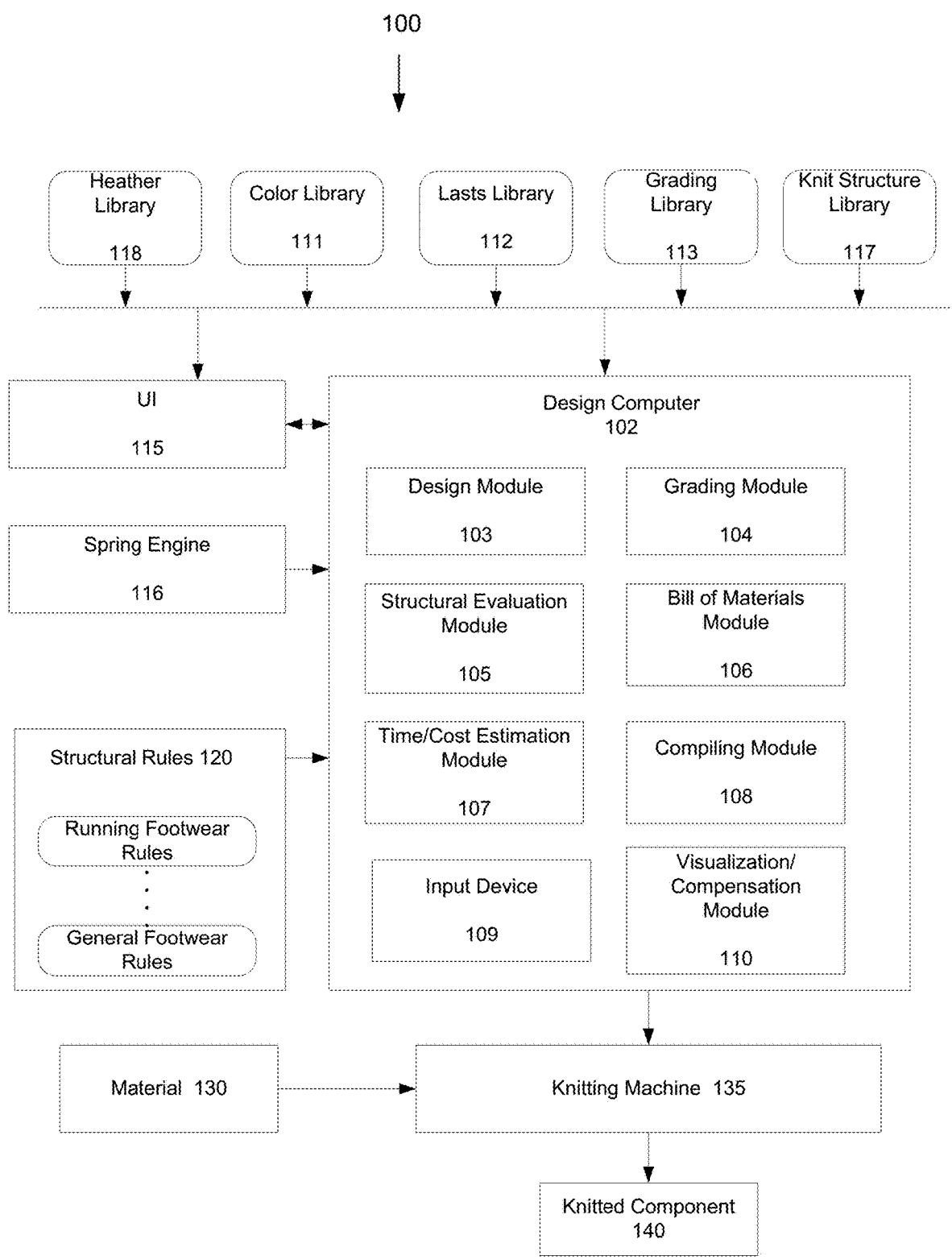
FIG. 1 illustrates a system for designing knitted components, in accordance with one or more aspects of the present disclosure.

In general, as described above, some aspects of the present disclosure relate to systems and methods for designing consumer products, including products comprising a knitted component and/or fabric, as well as the simulation and evaluation of knitted designs and corresponding manufactured knitted component.

In recent years there has been an increased and heightened interest in knitting, a textile technology that has become extremely prolific across scales, materials, production processes and applications. Textile innovation, including knitting technology, has been associated with creating material assemblies, capable of responding to substantial changing conditions through their material and structural composition. Textile is used as a flexible, strong and lightweight medium for composite materials and therefore its computation and behavior prediction become of interest to manufacturers. As a highly engineered material, textiles and knitting in particular, can be customized in response to changing requirements and application, and achieve various performative characteristics that are beneficial to manufacturers in reducing the number of iterative (and costly) attempts that may be required to properly manufacture, based on the underlying product design, the intended knitted component having minimal fabric deformations.

Any desired type of design data may be controlled, altered, or customized by a user of systems and methods according to aspects of the present disclosure, such as: a color of a portion of a product, such as an article of footwear (e.g., the various upper portions or elements) or an article of apparel. If desired, systems and methods according to at least some examples of the present disclosure further may allow a user to select from a variety of materials or other characteristics for various portions of the article of footwear, such as different upper material(s); upper thickness(es); upper stiffness characteristics; arch support characteristics; impact-attenuation characteristics; size, orientation, and/or location of openings or windows in the upper; patterns of openings provided in the uppers; laser cutting designs and/or characteristics; laser etching designs and/or characteristics; etc.

While described above in conjunction with design of articles of footwear, aspects of the present disclosure also may be used for design of other consumer products, such as articles of apparel, etc. In the footwear example, a user may be permitted to select various features of the footwear and manipulate the visual image of the footwear from a software application that is displayed on the user interface or display screen. The user interface may display one or more tools for changing aspects of or otherwise manipulating various design data of the footwear, as described herein.

Users may use computing devices to access the design application and/or website. The computing devices establish a communication channel within a network and communicate with a messaging server system (comprising one or more server computers) that provide interactive design features used to change the design of a product. As will be disclosed in more detail below, any desired communication link and communication protocol may be used to provide and control the data exchange between computing devices and the system. Users may use a computing device to connect to the online design system via a network, such as the Internet, a local area network (LAN), a wide area network (WAN), or the like. Users may connect their computing devices to the system via any communication channel, such as web site portals and applications from various internal and/or external sites that link to the portal of the manufacturer.

Various types of computing devices may be used without departing from the present disclosure, such as any computing device capable of establishing a networked connection and/or a peer-to-peer connection and capable of providing the necessary display, user interface, and input capabilities, as will be described in more detail below. Some more specific examples of computing devices that may be used in systems and methods in accordance with at least some examples of the present disclosure include, but are not limited to: desktop computers, personal computers, laptop computers, palmtop computers, handheld computers, cellular telephones, any other mobile devices or smartphones, personal digital assistants, computer workstations, televisions, and the like.

Computing devices that may be used in systems and methods in accordance with examples of the present disclosure may include one or more input devices and a data processing system (e.g., including one or more microprocessors). Examples of input devices that may be included with the computing devices include, but are not limited to conventional input devices, such as: a keyboard (hard keyboard or soft keyboard); a mouse, trackball, rollerball, touchpad, or other pointing device; a stylus or other pen-type input device (e.g., for a tablet PC type computing device); a disk drive; a USB port; a network connection; a joystick type controller; a telephone connection; an Ethernet connection; voice recognition capabilities; etc. Also, the computing devices may have "touch screen" capabilities, such that a user input data into the computing device by physically touching the screen of the display with the user's fingers or a selection device, such as a stylus. Additionally, any desired type of display device may be provided for use in conjunction with the computing devices of systems and methods according to aspects of the present disclosure, including display devices integrated with the computing device itself or display devices separate from the computing devices but in communication therewith, such as projector displays, separate monitor displays.

Example Design & Manufacturing System

FIG. 1 illustrates a system (e.g., system 100) for designing and manufacturing consumer products, including, but not limited to, knit footwear uppers. The system 100 may comprise a computing device, such as design computer 102 may be programmed with software modules that perform various functions when executed by at least one processor. Software includes computer-executable instructions that may be stored on at least one tangible non-transitory computer-readable medium, such as a solid state or magnetic memory.

The design computer 102 may be connected to a network (not shown) in any desired manner without departing from aspects of the present disclosure, including in conventional manners that are known and used in the art, such as any conventional wired or wireless connection and using any network connection protocol. Additionally or alternatively, the design computer 102 may be operatively in communication with one or more computing devices in a separate network, such as a network associated with a manufacturer or a network dedicated to one or more knitting machines for fabricating the knitted component.

Systems and methods in accordance with examples of the present disclosure also will provide a user interface display on the user's computing device. This interface will allow the user to see the subject matter of the design effort and will allow the user to introduce his/her input to the design effort. The user interfaces on various devices will be provided and controlled by the user's computing device and/or by the server system, and data for generating, maintaining, and receiving input through the user interfaces will be generated and provided via computer readable media included as part of or associated with the computing device and/or the server system. Examples of such computer readable media include, but are not limited to: computer-readable memories, both internal to a computer (e.g., hard drives) or separable from the computer (such as disks, solid state or flash memory devices, data available over a networked connection, etc.), including any type of computer readable media that is conventionally known and used in the computer arts.

The system 100 may comprise a variety of data structures, such as libraries for storing information for designing and manufacturing the knitted component. For example, a color library 111 may contain various color values. Individual color values may be arranged in a database, such as a FileMaker Pro database. In one embodiment, the color values have four channels such as CMYK color values. In another embodiment, the color values have three channels such as RGB color values. The individual color values may correspond to the colors of various materials (e.g., yarn) that are in supply or available to the manufacturer of the knit product. A heather library 118 may be connected to design computer 102 via the Internet. The heather library may contain information regarding various heather patterns that may be created by one or more knitting machines available to the manufacturer of the knit product. A lasts library 112 may store information regarding lasts of various shapes and forms. The lasts library may also store data files corresponding to footwear designs. A grading library 113 may store information regarding a collection of previously graded uppers. The collection may identify features of the product, e.g., footwear, such as locations of structures and other attributes along with modifications that were made to grade a base design for use with a range of shoes sizes.

A knit structure library 117 may store information regarding various knitted structures that may be used to design and manufacture knit products. The different knitted structures that are assembled in the design tool may be used to form the library 117. In some instances, knitted structure information may be obtained from one or more other computing devices or suitable storage locations, for example, a remote server of a product manufacturer. Additionally or alternatively, a user may access and store knitting information at the knit structure library. Thus the library 117 may, over time, accumulate and store knit structure information and other data for each knit structure stored therein. As will be described in more detail below, the present knitting system may be configured to create a library of knitted structures that may be used to improve the knitting process, as well as the reliability and accuracy of fabricating/manufacturing complex knitted components/products, thereby reducing manufacturing issues, improving the knitting machines efficiency of material use, which would result in less material waste due to better fit and performance of the knitted outcome.

As explained above, in some instances, an initial data set of knitted structure information may be used to calibrate the knitting system (and/or knitting machines therein) to identify and distinguish fabric deformations in knitted components. Given that each knitted structure has different structural and visual characteristics, when different structures are combined, linear and spatial deformations occur where linear deformations may change the length of a knitted segment and spatial deformations may change the way a knitted segment is naturally curved thus becoming not planar. Complex distributions of the knitted structures in a knitted component cause more extensive deformation from the overall intended shape/frame of the knitted component. Thus, to calibrate the knitting system, different aspect ratios of knitted components may be measured and incorporated into the knitting system (and/or a computation tool therein).

In some instances, this initial data set may be further calibrated by testing different variations of knit designs/patterns. For example, knit designs/patterns (or other image data) may be incorporated into the knitting system. There are a variety of ways in which the knit designs/patterns may be incorporated into knitting system including, among others, by scanning or importing an image, via a computing device, which is then sent/transmitted to the knitting system. Additionally or alternatively, the knit designs/patterns may be incorporated into knitting system by generating a parametric design internally, by designing stitches comprising different stretch and visual characteristics via the knitting system, and/or by allocating a stitch pattern to a specific area or color within the design, so that different areas have different linear and spatial deformations. One or more of these knit designs may be based on variations of a 3-color knitting technique. One such technique, the "Bird's eye" stitch simultaneously knits with three different yarns of different colors, wherein each area of the pattern can differ in both structure and yarn, and as such, multiplying the possibilities for creating knit combinations. With respect to the example above, such knit design/patterns may be positive/negative by nature, any one of the three different yarns can be advanced by the knitting machine to the positive side of the fabric forming a solid or mixed combination with either of the other two yarns. For example, FIG. 2B illustrates two knitted components, produced by a knitting machine, having identical knitting designs and knitted structure, but knitted using alternating (yarn) colors. Accordingly, the improved knitting system may utilize information obtained from the initial data set and/or calibration testing to generate knitted structures, thereby increasing the number of knitted structures available for the knitting system to analyze when predicting fabric deformation. The knitting system allows for an allocation of yarn color to design color and for an allocation of stitch type, thereby increasing the number of available combinations that may be used to create/generate knitted structures via the knitting system. Furthermore, the knitting system takes into consideration the deformation and other geometric information of the knit design and knit structures, such as stitch aspect ratio, when generating knitted structures. Likewise, these improvements also allow the knitting system to introduce material/yarn color as another layer of information that may be used to improve the prediction of knit deformations and other outcomes.

As will be described in more detail with respect to FIGS. 3A and 4A, design websites, interfaces, and/or applications as described herein may display various patterns or models available for custom design, e.g., in one portion of an interface display. These various different models of the product (e.g., footwear, apparel, rugs, artwork, etc.) may include template or "base" models that are available for a user to select as part of the design process. Such "base" models or templates may be added to or changed based on the user's selections during the design process.

Some of the components shown in FIG. 1 may communicate data to and from design computer 102 during a design session. For example, UI 115 may establish a communication channel with design computer 102 to provide a user interface for customizing or modifying a footwear design. The user interface may also be used for sampling input data received from the design computer. The user interface may also be used to allocate knitted structures for a design. The user interface may receive information relating to the knit structures from a library, such as library 117. Allocation logic (of the user interface 115) for allocating knit structures to various designs may be controlled by the user and allows flexibility in the design process. In some embodiments, the user interface 115 may be executed and/or incorporated within design computer 102. Various types of software applications may be executed in conjunction with or incorporated into the user interface 115, including, but not limited to, Rhinoceros 3D CAD software application ("Rhino"), with Grasshopper visual programming language and environment for parametric design. The software for generating the user interface 115 may reside on computer readable media present on or available to the design computer 102 or knitting system 100. Alternatively, if desired, the software, or at least some portion(s) thereof, may reside on more than one computing device of knitting system 100. The knitting system may be operated and maintained by the same organization(s) or individual(s) that operate and maintain the design computer 102, or the knitting system may be operated, controlled, and maintained, in whole or in part, by a party separate from any or all of these entities. As some more specific examples, the knitting system may be operated and maintained (and the user interface 115 also may be operated and/or maintained) by one or more entities whose products are being manufactured through the knitting systems and methods described below (e.g., a manufacturer, a vendor selected by a manufacturer or retailer, etc.).

A structural rules component 120 may provide design computer 102 with data relating to one or more structural rules associated with the physical and/or structural integrity required for a footwear upper (and/or other article of apparel) to be manufactured and the corresponding base design. Various types of product-specific structural rules may be stored the rules component 120, such as running footwear rules providing structural integrity requirements and characteristics inherent for running footwear. As will be discussed in more detail, these structural rules may place certain limitations on a user's ability to modify certain aspects of the footwear design during a design session in order to maintain the structural integrity of the footwear upper when manufactured and for use by a wearer. In some aspects of the present disclosure, the structural rules associated with the physical and/or structural integrity required for a footwear upper may vary based on the type of footwear (e.g., running footwear, basketball footwear, football footwear, etc.), or type of apparel or product.

Design computer 102 may contain various modules for executing various operational functionality of the design computer. For example, design computer 102 may include a design module 103 that processes various design changes made to a footwear design via user interface 115. Design module 103 may also render images of the footwear design in accordance with the processed design changes. Design computer 102 may include a grading module 104 for processing and determining changes that may be applied to a footwear design based on a grading change (e.g., increase or decrease in footwear size). For example, grading module 104 may extract information associated with a base footwear design and compare that information to data stored in grading library 113 to render a new base design for a different footwear grading. In some embodiments, grading module 104 may recommend one or more design changes to a base footwear design in view of processed grading information. By calculating a difference between the desired 2D/3D shape and the predicted one according to changes in the size (grading), the knitting system may use data indicating these differences (e.g. comparison data) to suggest geometric design changes to compensate for the calculated differences. The knitting system may suggest such design changes based on and according to the known linear and spatial deformations of the particular stitches being used, for example, one or more of the stitches described with respect to FIG. 2A.

Design computer 102 may include a structural evaluation module 105 for processing data to determine whether design changes made to a footwear design via user interface 115 are acceptable. For example, structural evaluation module 105 may extract information associated with a base footwear design that has been modified to include one or more design changes, and compare that information with data from structural rules component 120 to determine whether an intended design change conforms to the predetermined structural rules and/or physical limitations associated with the base footwear design and/or knitting machine used to manufacture the footwear upper. This extracted information includes, for example, the stitch elasticity and aspect ratio associated with the design, which may impact the final shape and performance of the resulting footwear. Additionally or alternatively, the extracted information may include knitting machine limitation, which indicates a threshold number of different colors or stitches that may be applied to particular areas of the design. In some aspects of the present disclosure, the evaluation module 105 may operatively communicate with a database (or other suitable form of storage) storing a plurality of predetermined structural integrity characteristics associated with each of base footwear designs available for selection by the user.

Design computer 102 may include a bill of materials module 106 for processing data relating to the availability of the various materials that may be utilized for manufacturing knitted component 140 in accordance with a product design, such as a footwear or apparel design. Design computer 102 may extract information associated with a base design and compare that information with data relating to a current supply or availability of material 130 to determine whether a requested design change is acceptable.

Design computer 102 may also include a time/cost estimation module 107 for processing data relating to the cost of manufacturing knitted component 140 based on the footwear design. Design computer 102 may extract information associated with a footwear design and compare that information to data collected by and/or stored in time/cost estimation module 107 to calculate a cost to manufacture knitted component 140 (e.g., a footwear upper) based on said product design, and to determine whether the cost exceeds any predefined cost thresholds. The time/cost estimation module 107 may recommend one or more design changes to the footwear design to reduce the estimated cost below the predefined cost threshold.

Design computer 102 may also use the time/cost estimation module 107 to process data relating to the amount of time needed to manufacture knitted components 140 based on the product design. Design computer 102 may extract information associated with a product design and compare that information to data collected by and/or stored in time/cost estimation module 107 to calculate an amount of time required to manufacture knitted component 140 based on the product design, and to determine whether the time exceeds any predefined time thresholds. The time/cost estimation module 107 may recommend one or more design changes to the product design to reduce the estimated manufacturing time below the predefined time threshold. In some aspects of the present disclosure, an interface or sub-interface may be displayed to a user during a design session depicting the amount of time required to manufacture the knitted component in view of the current product design. As the user modifies the product design, the interface (or sub-interface) may be updated to reflect an updated amount of time required to manufacture the knitted component, such as a knitted footwear upper.

Design computer 102 may also use the compiling module 108 to generate and/or output machine code and/or data files to a knitting machine, such as the knitting machine 135. The design computer 102 (or other computing device in the knitting system 100) may utilize the compiling module to translate source code directly. For example, the compiling module 108 may be configured to translate the source code from a high-level programming language to a lower level language, such as machine code. This process thus may enable the knitting system, including user interface 115, to bypass the standard interface of the knitting machine. Design computer 102 may also use the visualization/compensation module 110 to obtain and analyze information obtained from (i) the knit structure library 117 and previous/historical analysis of knit structures and/or (ii) output from a spring-based physical engine, such as engine 116, to evaluate differences between the knit design and predicted fabrication outcome of a knitted component. Design computer 102 may also use the input device 109 to process input data and other information, such as data supplied by an end user or designer. For example, via the input device 109, users/designers may control the distribution of different stitch combinations within a design of a knitted component, and to visualize selected/available knitted structures/designs via a user interface, such as UI 115. Design computer 102 may also include a variety of devices, interface units and drives for reading and writing data or files. Exemplary interface units and drives include a keyboard, pointing device, microphone, pen device, touchscreen or other input devices.

As discussed above, some of the components shown in FIG. 1 may be connected to each other via a network, such as a local area network (LAN) or a wide area network (WAN). For example, color library 111 may be connected to design computer 102 via the Internet. In another example, design computer 102 may transmit knitting instructions to the knitting machine 135 in the form of one or more encrypted files via a communication network, such as the Internet. The system shown in FIG. 1 may include conventional network components (not shown), such as switches, wireless access points and routers to connect the components shown.

Although illustrated as a single knitting machine 135 in FIG. 1, the knitting machine 135 may represent one or more knitting machines used to manufacture knitted component 140. These one or more knitting machines may be located in the same and/or different geographic locations. In some aspects of the present disclosure, the one or more knitting machines may be operatively in communication with each other. The knitting machine 135 may comprise an industrial flatbed CNC knitting machine that is programmable and built for industrial manufacturing. The knitting machine 135 may further comprise two parallel rows of needles, referred to as "needle beds," with a plurality of needles that are used for continuously knitting the yarns or other materials fed into the machine. These yarns or other materials (e.g., material 130) may be fed into the knitting machine 135 via multiple carriers. In some embodiments, the knitting machine may comprise sixteen (16) carriers. Complex knitted structures may be generated via the knitting machine by electronically controlling specific needles, which can transfer, skip and/or cross yarns between needles and across needle beds, to manufacture a knitted component based on an underlying knitted design. Flatbed knitting machines, such as the knitting machine 135, may be configured to seamlessly produce three dimensional volumes, and operate in high capacity with little to no human intervention. However, in the event of a fabric deformation in comparison to the intended design, or other manufacturing issues, a change in the knitting design program/process may be necessary. Such changes may typically require manual retrofitting by highly skilled operators, resulting in a substantial reduction in knitting capacity and efficiency, and an increase in product and related overhead costs. For example, when the outcome of the knitting machine (e.g., knitted component) is not as intended, a technician may be required to change or later certain knitting parameters to try to rectify the problem. Knitting parameters that may be changed manually include, among others, the stitch density and/or structural changes in the knit itself—such as adding or subtracting stitches, rows, etc. This hindsight based approach to producing a desired knitted component and making adjustments to a knitting machine is time-consuming and costly. According to the embodiment described herein, such adjustments and changes are not required given that all knitting parameters will be calculated to optimize the shape and outcome of the knitted component. Thus, reducing the necessity/need for manually retrofitting knitting machine when confronted with such manufacturing issues would be desirable.

In one aspect of the present disclosure, the present knitting system may be used to customize knitted products that are generated via industrial flatbed knitting machines. For example, by incorporating knitting machines in retail locations for in-store on-demand customization, a user may create a particular design of a knitted component and have a knitted component manufactured based on that design. In some instances, these attempts at providing on-demand product customization of knitted components are limited in scope and operability, thus using customization simply as a means for personalizing the design of a knitted component or product, usually within predefined and limited parameters, such as changing only the colors of the yarns. Other instances may include fit modifications to the knitted component in a limited and prescribed manner. This form of a more tailored knitted product "customization" may be supported by the present knitting system, which seeks to simplify the knitting interface, and make it accessible for customization directly by end users.

As will be explained in more detail below with respect to FIG. 3A, and other figures, in other aspects of the present disclosure, the present knitting system, design tools, and manufacturing of knitted components encompasses a much broader definition of customization, which includes providing a design environment configured to allow a user to make substantial changes in knitted structure combinations (e.g., size, shape, material composition, etc.) all within the same fabric or knitted component. Computational knitting can greatly benefit from additional contributions, such as those described herein, which further develop and refine tools for digital knitting fabrication.

Additionally, different data sources can be generated and/or obtained by the knitting system to directly drive knit production, and further to: serve as input for product specification; to enhance accuracy and efficiency of production; and improve waste reduction. This knitting process and information flow, discussed below in more detail with respect to FIG. 3A, can happen in real time. This improvement in efficiency and communication along the design/fabrication pipeline can lead to an improved coupling between shops and production facilities. It may also lead to enhanced communication and data flows between remote parties to improve the knitting process, for example, data may be obtained remotely from online commercial activities whether online shopping, customer engagement, or other feedback information such as sensor data. By improving the knitting process to predict deformation and other fabrication issues in a knitted component, the knitting system described herein is enabled to improve the knitting process in a manner that provides high volume production for high diversity of knit designs and individualization on demand.

Within the framework of this changing environment for designing and manufacturing knitted components, in some aspects of the present disclosure, the system described above may comprise one or more computing devices, such as design computer 102 (or a computational tool therein) for utilizing multiple digital inputs, along with a live parametric pipeline, to generate the necessary machine code and output files for operating a knitting machine to manufacture customized knit designs. As will be explained in further detail below with respect to at least FIG. 3A, the knitting system 100, including one or more computing devices therein (e.g. design computer 102), may be configured to: (i) manufacture a fabric with multiple knitted structures within the same sample or knitted component; (ii) interchange knitted structures parametrically, in a way that does not alter the overall geometry and dimension of the outline of the fabric, and further maintains the geometric proportion of the customized design within the sample or knitted component itself; and (iii) operate aspects of the knitting machine directly from the computational tool.

In additional aspects of the present disclosure, various features of user interfaces, such as user interface 115 and/or other suitable interface, for accepting user input and providing a user with information regarding the knit design will be described in more detail below. Those skilled in the art will appreciate that the following description and the attached drawings merely represent examples of potential features, functionality, arrangement of interface components, orientation of interface components, combinations of interface components, and the like, of systems, methods, and user interfaces in accordance with one or more aspects of the present disclosure.

Additional aspects of the present disclosure relate to user interfaces provided on computing devices that allow users to design articles of footwear (or other consumer products). The user interfaces may include elements and features that allow use and/or activation of any of the features and/or functionality described above and/or any of the features and/or functionality described in more detail below.

As some more specific examples, aspects of the present disclosure relate to computer readable media including computer executable instructions stored thereon for generating a user interface for a footwear design session on a computer controlled display device. This user interface may include, for example: (a) a first display portion including at least one rendering of an article of footwear; (b) one or more selector elements (such as a pointer or cursor) that allow a first user to select a portion of the article of footwear; (c) an indicator indicating what portion(s) of the article of footwear has been selected via an individual selector element (such as text, icons, pictures, animations, etc.); and (d) a first element for producing a change in an appearance of the rendering of the article of footwear in the first display portion based on input generated by the first user. The first element (or at least some element of the interface) may include features like a color palette or color menu that allows users to change a color of a selected portion of the article of footwear and/or a component of the article of footwear (e.g., knit material); one or more orientation elements that allow users to change an orientation of the article of footwear as rendered in the first display portion; one way, two way, or multi-way user communication elements or features (such as textual input and display panel(s), instant messaging capabilities, audio and/or video communication capabilities, etc.); etc. The user interface further may include an input portion through which the first user can input data used to set up a collaborative footwear design session with a second user (or another user).

Given this general background and information, more detailed information regarding specific examples of systems, methods, computer-readable media, and user interfaces in accordance with the present disclosure will be described in more detail below. It should be understood that this more detailed description relates to various specific examples of the present disclosure and their features and functionality, and this description should not be construed as limiting the scope of the present disclosure.

I. Knitted Structures and Computational Design Tools

Customization of knitted fabrics is inherently possible through digital, mechanical and material control of every stitch combination within the resulting knitted component/fabric. When compared to other textile techniques, for example weaving, knitting is often considered more adaptable in its composition due to long continuous yarns that form the fabric or knitted component. In the knitted fabric/material, these yarns may be inner-looped by individually controlled looped stitches via a knitting machine. Changes in the course and tightness of the loops themselves, as well as with adjacent loops, may result in the overall attributes and performance of the knitted component, for example its tensile properties, density, opaqueness, repeatability, fall and other visual and physical characteristics. In addition, during the knitting process, it is possible for a manufacturer to switch yarns, and seamlessly integrate new materials in the knitted fabric/material.

Knitted fabrics are flexible and stretchy by nature, with nonlinear three-dimensional kinematics, a characteristic attributed to the inter-looping of the continuous yarns that comprise the knitted fabric/material. As will be explained in further detail below, aspects of the present disclosure pertain to the digital innovation of industrially manufactured knitted fabrics, including those fabrics/materials that may contain complex or multiple knitting stitch combinations within a portion of the same knitted component/fabric, which may be referred to as a "knitted structure." Complex knitted structures may be achieved by creating a sequence of constructions that repeat themselves and give the fabric its overall appearance and physical attributes.

Figure 2A:
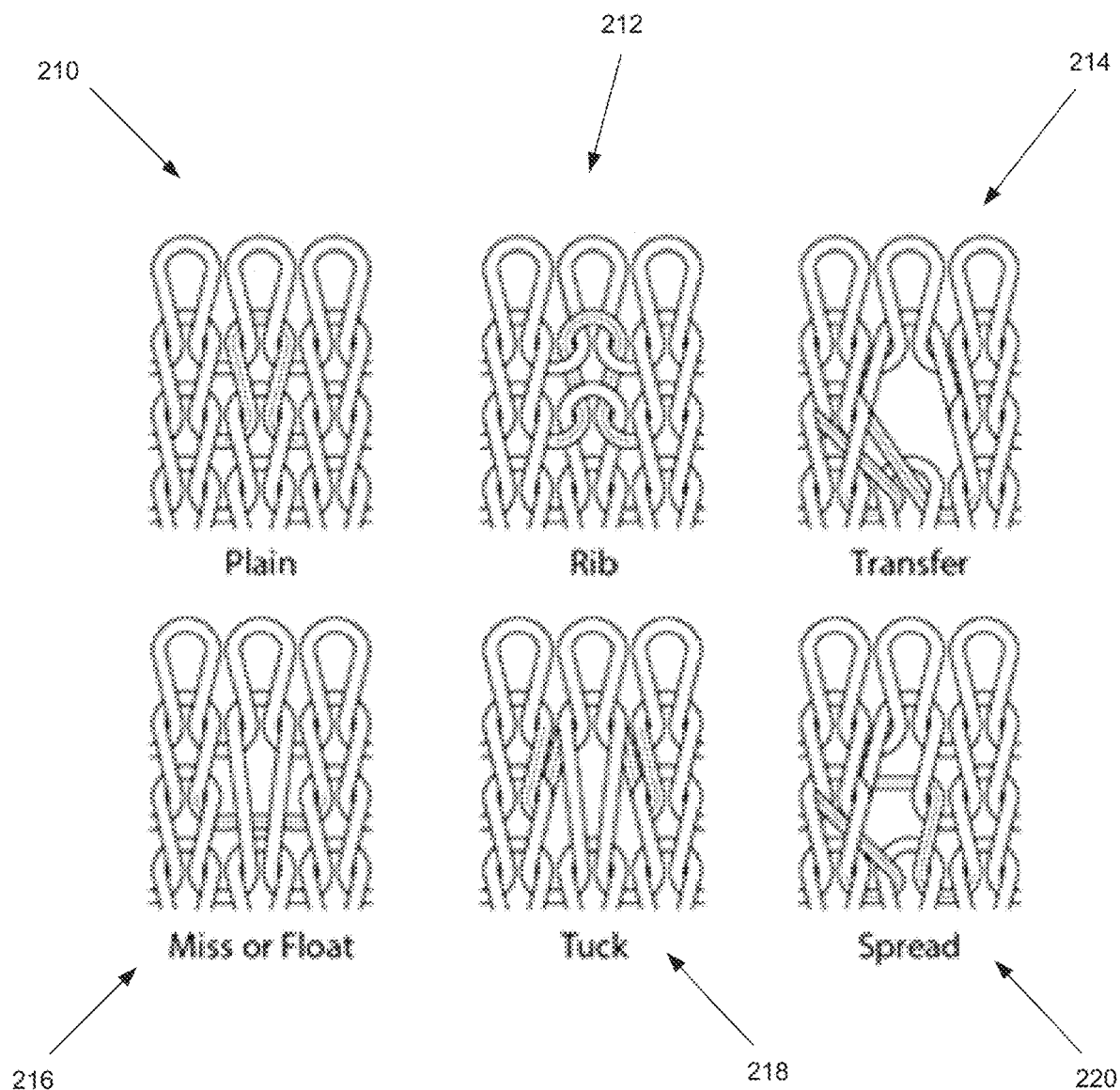
FIG. 2A illustrates example face notations for various knit constructions, in accordance with one or more aspects of the present disclosure.
Figure 2B:
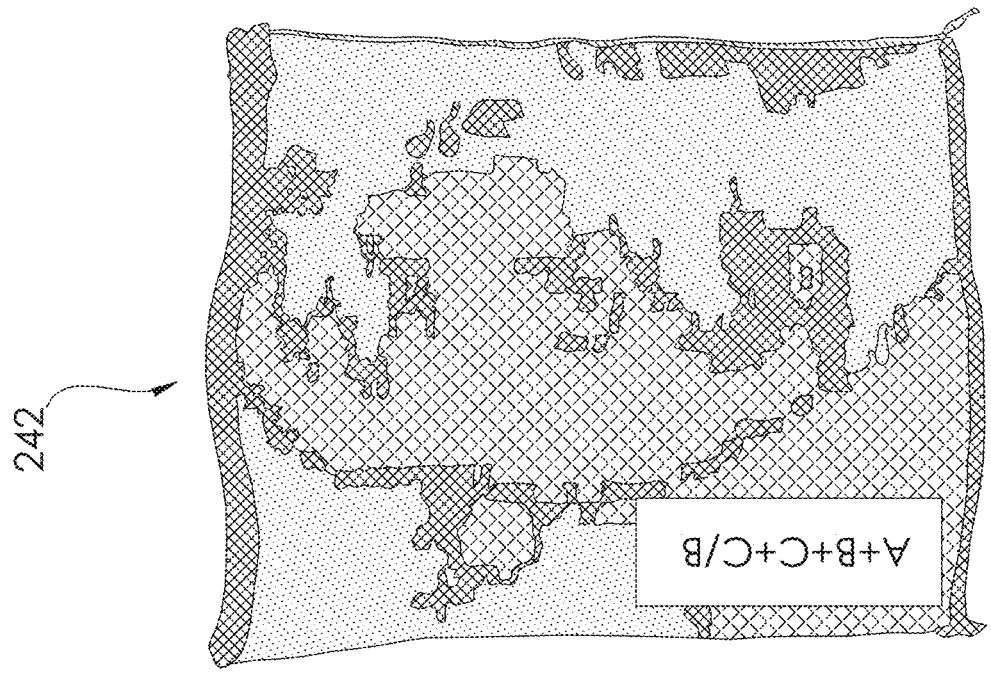
FIG. 2B illustrates examples of manufactured knitted components, in accordance with one or more aspects of the present disclosure.
Figure 2B:
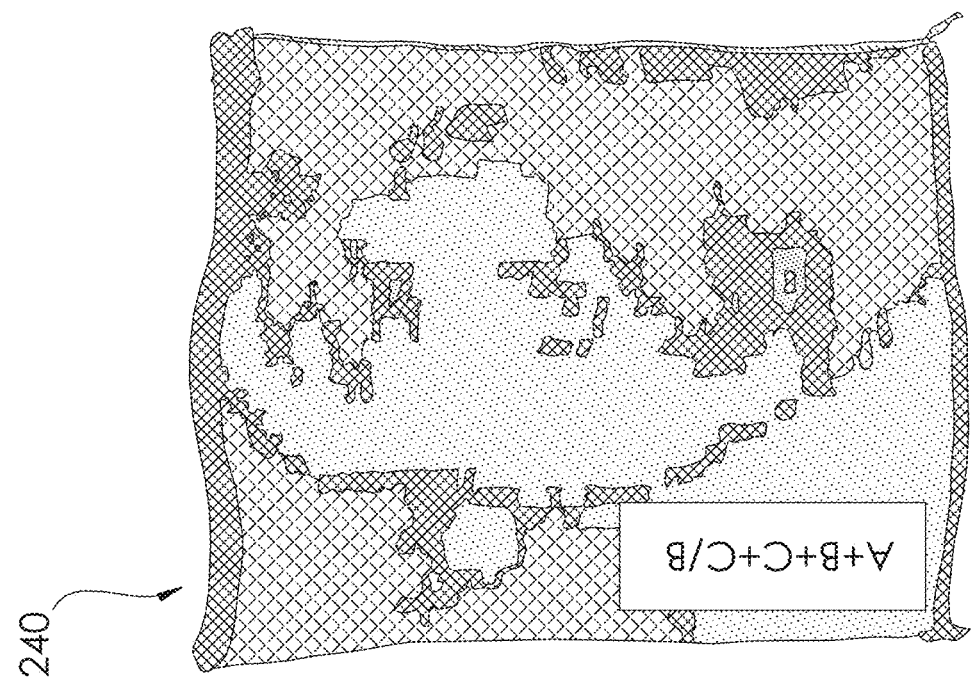

FIG. 2 shows examples of different complex knit constructions that may be employed to manufacture a knitted component. In particular, FIG. 2A illustrates the technical face notation of commonly used knit constructions, such as "Plain" construction 210; "Rib" construction 212; "Transfer" construction 214; "Miss or Float" construction 216; "Tuck" construction 218; and "Spread" construction 220. For example, a variety of different knitted structures may be generated using (and/or based on) a repeat sequence of one or more knit constructions, such as the Transfer and Tuck stitches. The information identifying one or more types of knitted constructions/compositions associated with and/or available for generating a particular knitted structure may be stored in the library 117.

In some aspects of the present disclosure, the knitting system 100 is informed by the process of knitting, and uses an unconventional bottom-up approach that stems from understanding fabrication needs and processes for knitting materials and operating the knitting machine 135. In some aspects of the present disclosure, one or more computing devices within the knitting system 100, such as design computer 102 (or a computation tool therein) may obtain and analyze a plurality of predefined knitted structures, for example, knitted structure information stored in library 117.

The design computer 102 may be further utilized to combine the one or more knitted structures within the same fabrics or knitted components. By strategically combining the various knitted structures within the same knitted component under various permutations, the design computer 102 may analyze one or more of the typical ratio proportion deviation, aspect ratio, and dimensions of each knitted component from an intended knit shape or design. For instance, a change in the stich density of a knitted structure may change the overall dimensions of the specific area of the knitted component, but it may not impact the ratio between width and length. An available visualization tool (e.g., module 110) may be used to simulate, based on a physical spring-based compensation analysis, the deformation of the knitted samples/components under a resting condition. Naturally, over time and with no external forces, a knitted structure that was held in a specific size on the knitting machine might be under tension due to the knitting process. Once this knitted structure is removed from the knitting machine and let rest, it may change its shape in order to conform with a minimum internal energy. This similarly explains the shrinking phenomena of any textile (or even other material), that when given enough time in resting conditions, without forcing it into any shape, will eventually allow for the knitted structure to deform into its "natural" shape. A number of differing modification tools may be used by the design computer 102 or knitting system 100 to automatically redistribute the forces in the knitted component/fabric, in a manner that compensates for the physical deformation, resulting in a manufactured knitted component that bears a greater resemblance to the intended knit design than would otherwise occur using conventional knitting systems/processes.

Figure 3A:
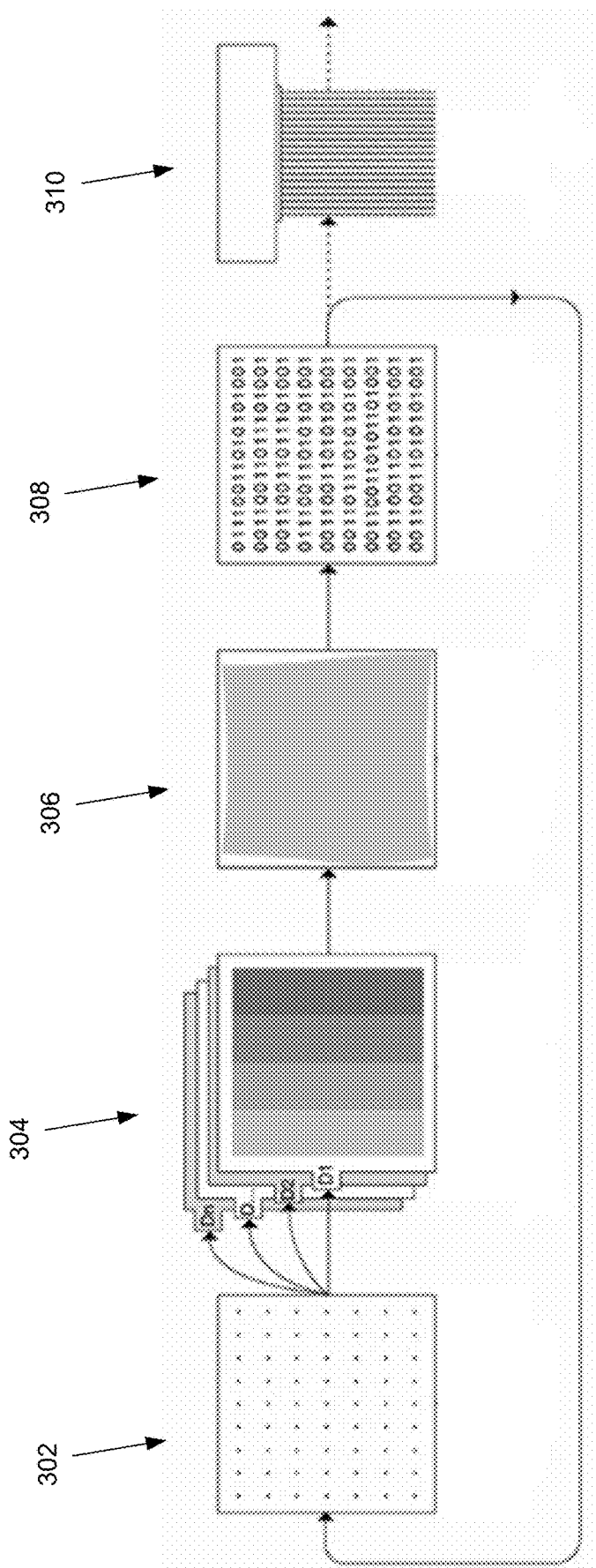
FIG. 3A illustrates an example workflow for designing and manufacturing knitted components, in accordance with one or more aspects of the present disclosure

FIG. 3A illustrates an example flow diagram for a method of designing and manufacturing knitted components, in accordance with one or more aspects of the present disclosure. The knitting process depicted by FIG. 3A may also be referred to herein as a "computational tool pipeline." The stages identified in FIG. 3A may be performed with a system such as the knitting system 100 shown in FIG. 1. The process shown in FIG. 3A comprises a plurality of stages (e.g., elements 302-308), each of which may include one or more steps in the process of designing and manufacturing the knitted component as described herein.

Figure 3B:
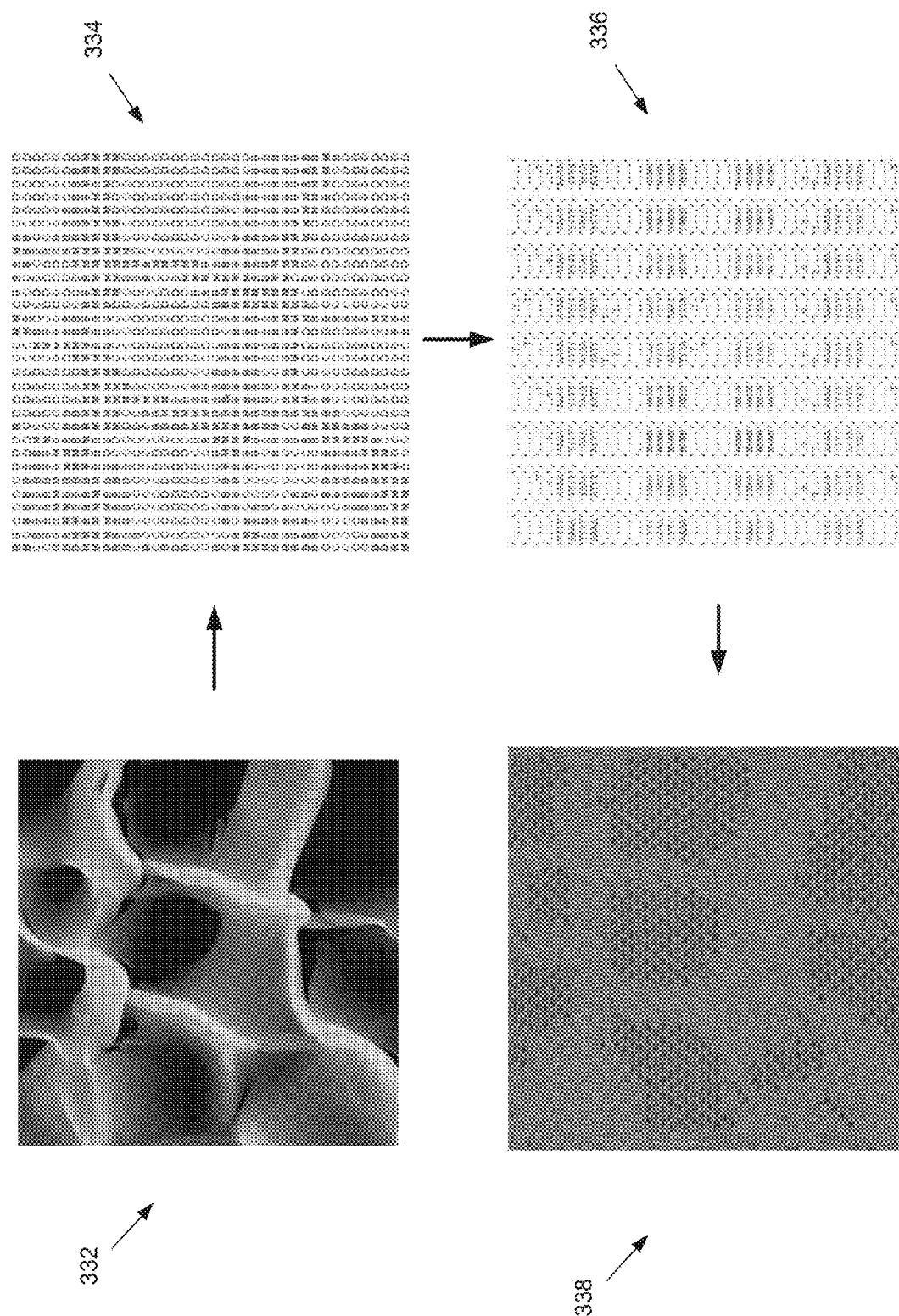
FIG. 3B illustrates an example workflow for designing and manufacturing knitted components, in accordance with one or more aspects of the present disclosure.
Figure 3C:
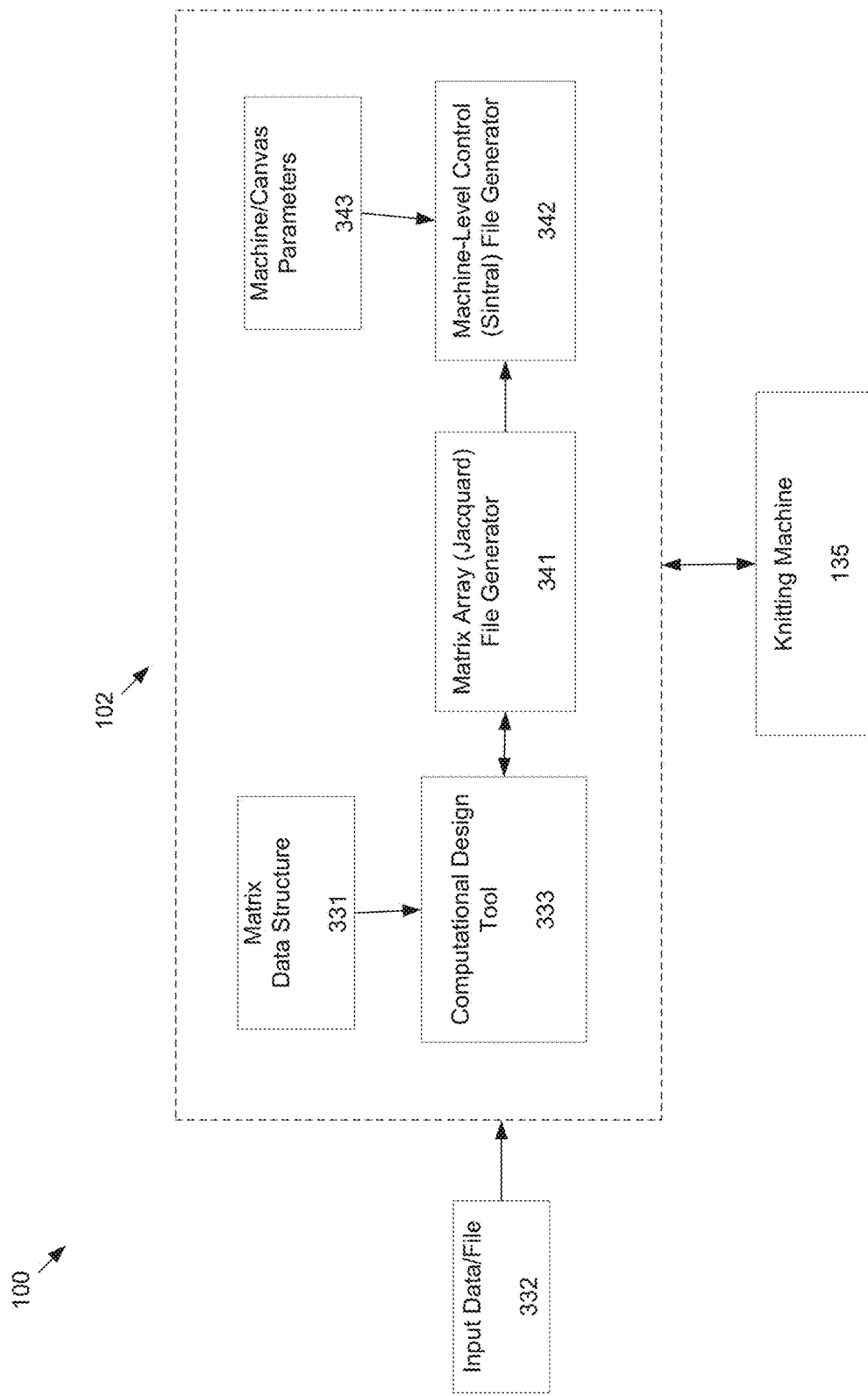
FIG. 3C illustrates additional components of a system for designing knitted components, in accordance with one or more aspects of the present disclosure.

For example, a first stage of the knitting process (or computational tool pipeline) may comprise an input stage, such as stage 302 shown in FIG. 3A. At this stage, the knitting system 100 may obtain input, including design input, for manufacturing the knitted component. As an example, as shown in FIG. 3B, element 332 represents an example image that may serve as input data and/or an intended knit design for the knitting processes. In this example, the image represents an aerial picture of sand dunes. Various other images, pictures, knit designs, and other information may be used by the knitting system 100 as input data. Additionally, FIG. 3C illustrates additional elements of knitting system 100 that may be used to perform various stages of the knitting processes shown in FIG. 3A and described herein. For example, as shown in FIG. 3C, design computer 102 may receive and/or obtain input data/file 332 from one or more other computing devices or suitable data storage.

The knitting system 100 may utilize an input device, such as input device 109, or other suitable device to obtain the input data. In some embodiments, the input device may comprise a parametric interchangeable input device, shown in FIG. 3A as an image input (e.g., element 302). The input device may be configured to interface with a variety of data formats/structures, for example, numerical vector, and/or raster data formats.

A second stage of the knitting process (or computational tool pipeline) may comprise a sampling and allocation stage, such as stage 304 shown in FIG. 3A. At this stage, the knitting system 100 may sample input data, such as the input data received at stage 302, using a visually flexible user interface, such as UI 115. The user interface may include and/or obtain from one or more other computing devices (e.g., design computer 102, structural rules 120, etc.) allocation logic, allowing the user to flexibly control the design of the knitted component. For example, a user may utilize the user interface 115 to select and/or allocate particular knitted structures and/or knitting compositions that may comprise the overall knit design. Different knitted structures and/or knitting compositions may have different visual appearances when manufactured, such that the use of different knitted structures for different portions of a component may be used to cause the component to resemble a particular image provided as input data. In addition, the overall knit design may include not only visual designs such a firm logo, but also different stitches that may impact the physical performance of the knitted article/component. In some aspects of the present disclosure, a computing device within knitting system 100, such as design computer 102, may access library 117 (or any other suitable storage) to obtain the knitted structures/compositions available for designing the knitted component.

A third stage of the knitting process (or computational tool pipeline) may comprise a visualization and compensation stage, such as stage 306 shown in FIG. 3A. At this stage, the knitting system 100 may evaluate the deformation between a design intent (e.g., the design of the knitted component before knitted structures are allocated) and the predicted/future physical behavior of the knitted fabric once manufactured by the knitting machine, based on the allocated knitted structures. The deformation is a spatial deformation of the knitted component relative to the design intent (i.e. a baseline geometry of the knitted component in accordance with an original design prior to the allocation of any knitted structures to form the component). The deformation may relate to at least a profile of the periphery of the knitted component (i.e. an outline). The deformation may relate to a mapping between a spatial distribution of a plurality of portions of the knitted component in accordance with the design intent, and a spatial distribution of the plurality of portions of the knitted component as predicted based on the allocated knitted structures. In some aspects of the present disclosure, one or more computing devices within the knitting system 100 may comprise a visualization and compensation module (e.g., module 110 of design computer 102) that utilizes information obtained from (i) previous/historical analysis of knit structures and/or (ii) output from a spring-based physical engine, such as engine 116, to evaluate such differences. As used herein, a spring based physical engine refers to a computational model used within software to simulate one or more segments of a knitted structure, design or component as a physical spring with a predefined internal force. This software tool is used to embed physical behavior in a 3D modelling environment and, further, allows for a live interaction as the simulation is running. The software tool, which may be implemented on a computing device, such as spring engine 116 and/or computer 102, provides various ways for generating forces which affect the particles in the simulation, calculating force exertion for a spring model which follows Hooke's Law of Elasticity through input measurements that are derived from the geometric model of the knit component.

A fourth stage of the knitting process (or computational tool pipeline) may comprise a compiling stage, such as stage 308 shown in FIG. 3A. At this stage, one or more computing devices of the knitting system 100, such as design computer 102, may generate and/or output machine code and/or data files for operating a knitting machine, such as the knitting machine depicted in FIG. 3A as element 310, or the knitting machine 135 shown in FIG. 1. In some aspects of the present disclosure, the design computer 102 may comprise a compiler, such as the compiler 108, for generating and/or outputting machine code and/or data files to the knitting machine 135.

A. Evaluating and Fabricating Knitted Components

The geometrical attributes of knitting, such as the ability for the knitted component to adhere to particular, complex, non-developable doubly curved geometries, and the fact that manufacturing the knitted component is digitally conceived and may be applied using countless materials and customized designs, explains in part why the development of enhanced design tools and manufacturing capability is desirable. In addition, there is a general interest in new building materials, as well as methods and processes for manufacturing knitted components, including extensive efforts for integrating robotics, automation, and machine learning in the fabrication and manufacturing processes. Accordingly, aspects of the present disclosure focus, in part, on complex three-dimensional geometries for knitted components, which may be suited for product architecture and can be used to develop textile-based building components for particular products that are differentiated in their appearance and structural attributes, thereby providing the user with improved customization opportunities. For example, 2D knit footwear uppers may be fabricated, and subsequently used to produce 3D articles of footwear that incorporate the fabricated knit footwear upper.

In addition to structural considerations in relation to product architecture, other forms of information inputs are taken into account to delineate both visual and performative differentiations within knitted structures of a knitted component. For instance, in some aspects of the present disclosure, data from multiple sensors (not shown) may be utilized by the knitting system 100 to record/determine changes in the knitting environment, rendered as variations in a knitted facade. For example, within the context of fiber-based structures created using a mold-less winding technique, a continuous and mutual exchange of sensor information may be passed between a robotic effector and a pneumatic formwork during the knit assembly process. For instance, a sensor on the knitting machine may measure the actual length of yarn knitted into the fabric at a specific area. This data may be transferred to the design system and be used as a feedback mechanism to better control and better design the knitted article. This communication of information may facilitate more predictable change and variation within the defining computational model or knit design. The examples and applications described herein exemplify the importance of creating a direct feedback between the design domain and actual fabrication of the knitted component, as well as the potential of collected information to significantly change manufacturing towards becoming more diverse and individualized systems.

Although recent advances have made knit simulation somewhat more tractable and predictive, such achievements are not usually aimed at manufacturing, and instead focus on the design of a knitted component, and not the subsequent manufacture or fabrication of said component. Using different logic and algorithms for abstracting the complex physical behavior of textiles in an effort to computationally model the behavior of textiles can be challenging. In particular, knitted fabrics are noted as more challenging and specific to model than woven fabrics, which more commonly and simplistically represent textile behavior.

In some aspects of the present disclosure, differentiating between simple and more complex knits, the knitting system 100 (or one or more computing devices therein, such as design computer 102) may process different types of knitting stitches/compositions, to determine various courses of the yarns comprising a knit design, testing sample, or knitted component, and how the yarns individual path influences the overall physical fabric motion. One example is use of general mesh representation in the CAD (Computer Aided Design) environment which are assigned specific stitch types with different observed physical rest lengths assigned to each of its faces. This enables one to replicate a variety of more complicated knitting patterns, and may be used in the present knitting system for purposes of calibration and data collection with respect to a jacquard weft knitted lace fabric, wherein a spring-mass simulation may be implemented, by the knitting system (e.g., spring engine 116), to replace the general pattern of the fabric with a stitch cycle that forms a new secondary grid for the simulation of the pattern.

In aspects of the present disclosure, simulation models may be used to determine/predict the mechanical interactions between yarns or other materials at the cross section of yarns at each stitch intersection of a knitted component. For example, computational models such as neural network and fuzzy logic models may be used by one or more computing devices of the knitting system 100 (e.g., design computer 102) to predict the tactile characteristics of knitted textile with relation to finishing treatments. Such computational models may include numerically characterizing complex concepts related to human sensory evaluation of textiles.

In some aspects of the present disclosure, the knitting system 100 may utilize one or more computational models to simulate and/or predict the physical behavior of a knitted component. For example, a spring model may be used as the physical engine for implementing the simulation given that it provides a quick and reliable testing/simulation method, and uses a modelling logic of particles which is compatible with the component-based modelling of knitted fabrics. The spring model utilized by the knitting system 100 may be stored on and/or executed at spring engine 116.

As will be explained in more detail below, the knitting system 100 may be configured to embed information indicating the physical behavior and characteristics of the knitted component directly into a 3D modelling environment, thereby allowing for a "live" (e.g., dynamic, real-time) interaction with the knit design, while the simulation is running. In some embodiments, the design computer 102 may be configured to perform such steps. For instance, such steps may be carried out by a computational tool of the design computer 102, such as computational tool 333. The knitting system may include various ways in which to generate forces that may impact portions of the knitted component within the simulation. In some embodiments, the knitting system 100 may determine force exertion for a spring model by using and adhering to the principles of Hooke's Law of Elasticity. The spring-based method may also be utilized for simulating fabric behavior, thereby creating a modeling and simulation environment in a programmable language, such as Processing (Java), coordinated with finite element analysis.

Finally, in other aspects of the present disclosure, one or more computing devices of the knitting system 100, such as design computer 102, may execute an application (or other software suitable software/module, such as a compiler—e.g., compiler 108) to bypass the standard interface of a knitting machine, and to translate a source code directly from a high-level programming language to a lower level language (machine code). This bypass may be implemented when the knitting (or operational) tasks to be performed by the knitting machine cannot be achieved by using the regular/standard knitting machine interface. Such is the case when fabricating/manufacturing at least parametric knitting patterns, including those patterns that are based on variations of a generative, non-repetitive, large-scale geometry, which cannot be designed and/or handled through conventional knitting machine software.

In other aspects of the present disclosure, one or more compilers (or other suitable software/modules) of the knitting system 100 may analyze and/or process complex three-dimensional geometries for shaping a fabric into a particular configuration, such as a volumetric configuration. This may be achieved, for example, by providing an automated knitting system to: (i) form volumes and control their geometry, (ii) stitch the volumes together, and (iii) instruct one or more knitting machines to construct and/or manufacture the knitted component. In still other aspects of the present disclosure, the knitting system 100 may utilize a knitting machine (e.g., by the design computer 102 transmitting knitting instructions to the knitting machine 135) to knit complex, non-developable surfaces within a single knitted component or article of fabric, without the necessity of tailoring or stitching. The knitting system 100 may utilize the design computer 102 (or a computational tool therein), to: (i) automatically sample shapes, knit compositions, and/or knitted structures, (ii) dissect the knitted structures into one or more knitting rows, and (iii) generate and/or fabricate one or more knitting patterns.

In other aspects of the present disclosure, rather than using the machine logic for instructing needle commands as single consecutive operations, the knitting system 100 may utilize a knitted component or a portion thereof (e.g., knitted structure(s)) to guide the computational model, in particular, the knitting system may utilize the knitted structure repeat sequence(s), used by the knitting machine, to fabricate/generate a new knitting structure and/or a subsequent knitted component. In this way the knitting system 100 may provide improved control and enhanced, more efficient, prediction levels for implementing design decisions prior to manufacturing the knitted component, and informing the end user of available design options. By enlarging the scope of users, thus providing foundations for creating a general design environment for design-to-production of knitted components, the knitting system is able to decrease/reduce conventional dependency on technical experts to perform such tasks.

II. Additional Examples of Evaluating and Fabricating Knitted Components

In some aspects of the present disclosure, the knitting system 100 may be configured to utilize the knitting machine to generate knitted components without using the conventional/standard software interface(s) of the knitting machine. The design computer 102 may implement a computation tool (e.g., computational tool 333) that outputs two coinciding files, which in some instances may be required for the knitting machine 135 to manufacture the knitted component. The first file may comprise a detailed machine-level control language. In some instances, the first file may comprise a Sintral file, and may be generated by a file generator of design computer 102, such as file generator 342. The second file may comprise a matrix array. In some aspects of the present disclosure, the matrix array may contain data indicating a knitting plan for the knitting machine. This matrix array may also comprise data indicating and/or denoting every stitching needle action and operation, such as a Jacquard file. In some instances, the Jacquard file may be generated by a file generator of design computer 102, such as file generator 341.

In some aspects of the present disclosure, one or more computing devices of the knitting system 100, such as the design computer 102, may be configured to allow the designer or user to incorporate design changes within a predefined knitting area of the knitted component. The design computer 102 may also determine the shape and/or scale of an outline of the knitting component to be manufactured, as well as the graphic composition of the contents of the knitted component. Additionally, the knitting system may be configured to manufacture/fabricate the knitted component in various shapes and patterns, for example, the shape of a footwear upper or an article of apparel. In some aspects of the present disclosure, the knitted component may comprise a rectangular shape, which may improve the ease in which one or more computing devices within the knitting system 100, such as design computer 102, may evaluate deformations from the original intent of the knit design. The knitting system 100 may be configured to manufacture one or more knitted structures within the same knitted component, which leads to fabrics with inherent complexity in two-dimensions (2D) given the different densities of the various knitted structures that may coexist within the same knitted component. The importance of maintaining the shape of the fabricated knitted component(s) pertains to the later connecting of the 2D layout pattern (e.g., footwear upper) into three-dimensional (3D) forms (e.g., an article of footwear). In some embodiments, the connecting of the 2D layout pattern into a three-dimensional (3D) form may be achieved by sewing, which may be performed by the knitting machine 135 or other suitable machines for sewing (not shown in FIG. 1). This both explains and underscores the importance of achieving accurate, reproducible dimensions for the knitted component. Moreover, fabricating 2D forms with bends and creases, which are typically used in knitting processes to achieve slight volumetric shapes prior to sewing, depend on the ability of the knitting machine to create variations in knitted structures. Thus, an objective of the present disclosure may relate to the fabrication of 3D shapes via the knitting machine.

In some aspects of the present disclosure, an input device in the knitting system (e.g., input device 109) may enable users/designers to control the distribution of different stitch combinations within the knitted component, and to visualize the knitted structures/patterns via a user interface (e.g., UI 115) before physically knitting or fabricating the knitted component. Conventional design and/or visualization tools do not attempt to simulate the physical behavior of the knitted fabric in resting condition. Likewise, under conventional design systems, the combination of different knitted structures requires substantial professional and technical expertise, in particular, when considering performative behaviors of the different knitted structures when stretching and deformation is taken into account. As a result, previous attempts to "sketch" a design pattern for knitted fabric and to predict the behavior of the knitted fabric before it is actually knitted/manufactured have proven burdensome, time consuming, and inefficient because this process usually requires iterative manufacturing attempts, using one or more knitting machines, to fabricate a knitted component which has a physical appearance that accurately corresponds to the intended knit design. In fact, even when experienced knitters and/or technical experts are involved, the conventional "sketch" approach described above still requires numerous iterations to fabricate an appropriately shaped knitted component, based on the complexity of the knitted structures/pattern and the stitch patterns for the knitted component to be fabricated by the knitting machine.

Figure 4A:
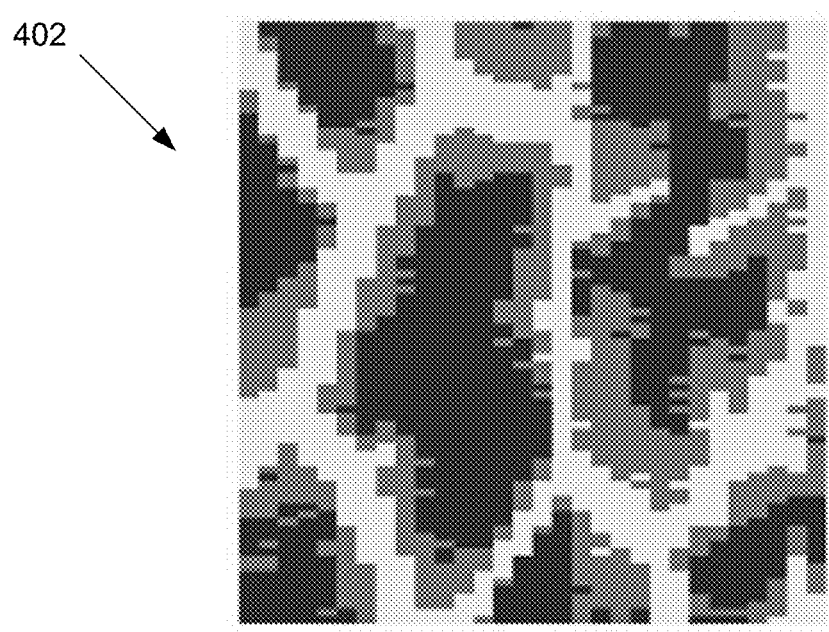
FIG. 4A illustrates example knit design for manufacturing a knitted component, in accordance with one or more aspects of the present disclosure.
Figure 4B:
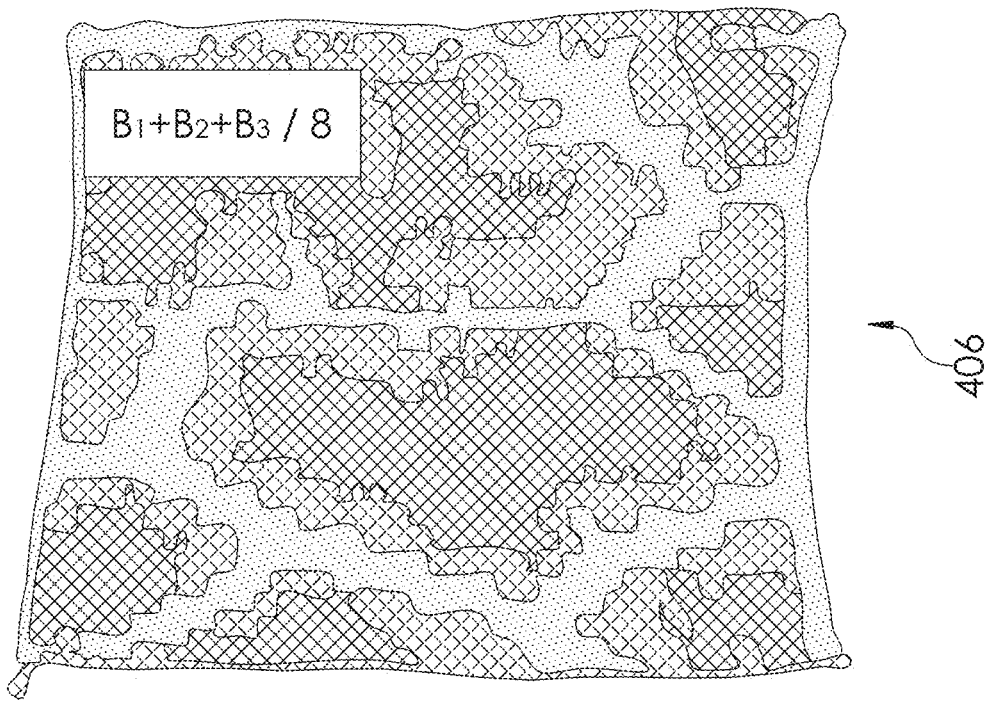
FIG. 4B illustrates knitted component examples fabricated using differently-colored materials, in accordance with one or more aspects of the present disclosure.
Figure 4B:
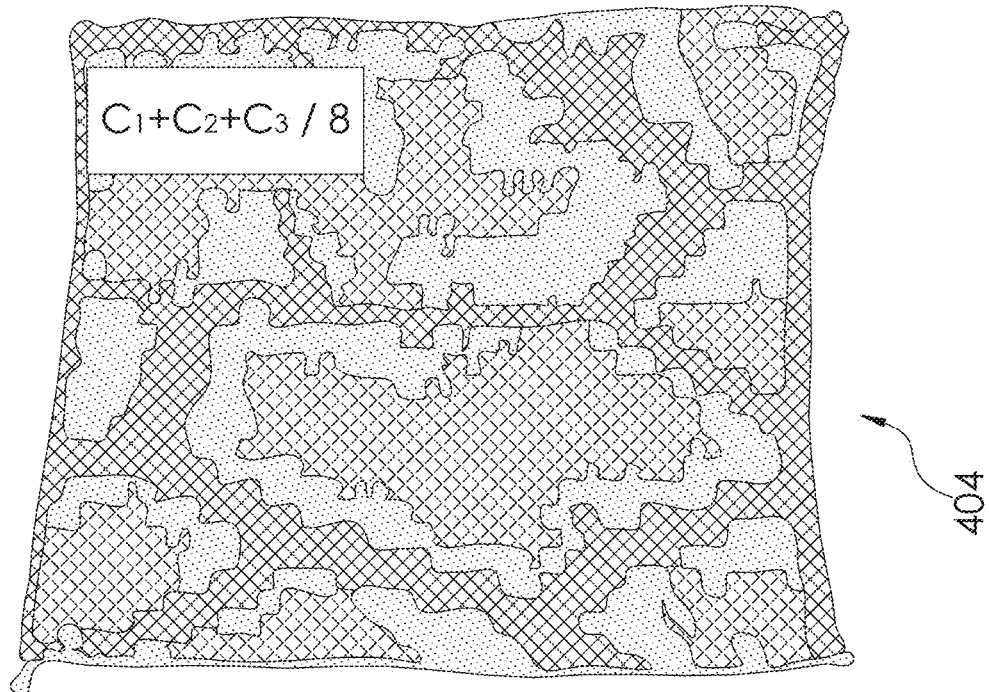

For example, FIG. 4A shows an example knitting design (e.g., knit design 402) that may be used by the knitting system 100 to fabricate/manufacture a knitted component. The knitted components 404, 406 shown in FIG. 4B and described in more detail below, are variations of the knitted structures (stitches) allocated to each color in design 402, and as such, provides variations in overall shape and deformation. In some instances, knit design 402 is initially received without any knitted structures and according to the grayscale definition the software may allocate individual knit structures—darker areas of the grayscale representation may indicate more condensed knit structures, while lighter areas indicate net-like (or less dense) knit structures. This parameter may be controlled and changed by the user. In addition, as described herein, users may assign colors (e.g., yarn colors) to the knit design. FIG. 4B shows two knitted components (e.g., knitted components 404, 406) that were fabricated by a knitting machine using different knitted structures, thereby resulting in a different shape of the fabric outline for each of knitted components 404 and 406. As shown in FIG. 4B, the knitted components also include different dimensions of the overall fabric to one another. In the examples shown in FIG. 4B, both knitted component samples (e.g., elements 404, 406) were knitted by a knitting machine using three identical yarns of three different colors. As such, for at least the exemplary knit design 402 shown in FIG. 4B, this particular allocation of knit structures to the knit design has a slight impact on the overall dimensions of the knitted component when yarns/material of different colors are used to manufacture the knitted component.

At least one object of the present knitting system is to provide a mechanism for testing/evaluating the computational parametric fabrication of knitted components/fabrics with an emphasis on connectivity between design, design variation, knitted structure allocation and industrial manufacturing/fabrication. In some aspects of the present disclosure, data output of the design computer 102, such as machine code, maintains a live and/or real-time communication relationship between the knit design and instructions to the knitting machine, and also updates simultaneously with any parametric variations in the knit design (or user interface) environment. This is in contrast to conventional processes for knitting fabrics, which—as previously explained—require a number of manual digital conversions by different professionals, experts, or technicians involved in the process of industrial knitting.

Another objective of the knitting system described herein is improving digital customization and/or user interfaces for operating the knitting machine to enhance a fit and/or a performance of knitted products. In some aspects of the present disclosure, parametric variation in color distribution of materials (e.g., yarn) within the same knitted/fabric structure may be more easily achievable when using a homogeneous knitting pattern given that the physical attributes of the knitted component (e.g., elasticity, material type, tensile strength, elongation, flexibility, durability, etc.) may remain constant as well as the principle knitting commands. By contrast, parametric distribution of knitted structures may change performative aspects of the knitted component, and is also useful when designing knitted components for high performance products, such as footwear and wearable apparel. Accordingly, issues of fit (e.g., better grip, motion restriction and guidance, customized support, matching to irregular/asymmetrical physiognomy, etc.) may be better addressed by changing the knitted structures of a knitted component, rather than using conventional design/fabrication methods.

A. Matrix Data Structure Approach for Generating a Knitted Pattern

For designing knitting patterns/structures, the knitting system described herein may utilize an input device (e.g., input device 109), such as a parametric interchangeable input device, capable of using multiple data type sources, for example, numerical, vector, and/or raster-based data sources. Using multiple design inputs to instruct the knitting machine to fabricate the knitted component is founded on the idea of a flexible design platform, which may incorporate various types of data input sources, such as customer feedback data, sensor data, individualized body scans, and the like. In some aspects of the present disclosure, the knitting system 100 may use gray scale images (and/or other types of images or input data) to show/predict the potential of parametric distribution of different knitted structures within the same fabric or knitted component. In some examples, the grey scale images (and/or other input data used for generating the knitted component) can be interchangeable. Additionally, user control options may be provided, for example via the UI 115 and/or design computer 102, to enable the user to control the distribution of knitted structures within a knitted component.

As discussed above, at the input stage 302 of the example knitting process or computation tool pipeline shown in FIG. 3A, the knitting system 100 obtains, via input device 109, input data such as input data/file 332. Subsequently, the knitting system 100 or one or more computing devices therein (e.g., design computer 102) may process the input data to generate output files, including a two-dimensional matrix array. In some aspects of the present disclosure, the knitting system 100 may assign a unique character and/or identifier to one or more rubrics in the matrix array. In some instances, every pixel of a design is defined as dark, medium, or light according to a scale threshold, and is then assigned a unique letter/character. Each unique letter/character is expanded to a small array of letters which correspond to an array of commands used to form the matrix array. A rubric may comprise a sub division of the initial knitting area into small squares, each is assigned a letter, a unique character which is associated with a knitted structure. The user/designer may control the number of knitting structures, and their distribution logic. For example, rubrics can be distributed according to an image or data file, and the user may choose how the image is filtered basically replacing color pixels with structure "rubrics" or components. These rubrics serve as the mechanism for allocating the different stitch structure to an area in the knit design (e.g., knit design 402). This is achieved by allocating a color in the knit design the required rubrics, for example, by (i) filtering the pixel colors, (ii) using a parametric formula, or (iii) manually according to the designer the requisite allocation information. In some instances, the knitting system 100 may assign every rubric in the matrix array a unique character and/or identifier. The number of unique characters and/or identifiers assigned, by the knitting system 100, may correspond to the number of different knitted structures implemented for manufacturing/fabricating the knitted component. As shown in FIG. 3B, element 334 represents an example data structure (e.g., matrix array) of unique characters that may be generated as output, based on input data (e.g., element 332) and/or a knit design. The matrix data structure may be stored on design computer 102, as indicated by element 331 of FIG. 3C.

In some aspects of the present disclosure, the knitting system 100 may execute determining and/or allocation logic to distribute the different knitted structures for the knitted component with relation to a particular data input or file, such as a raster image. This distribution performed by the knitting system 100 may be achieved through the sampling of grayscale tones and/or other input data. As discussed above with respect to FIG. 3A, the knitting system 100 may perform such sampling, via a user interface 115, at a sampling stage (e.g., stage 304) of the knitting process or computational tool pipeline. As an example, a 16-bit grayscale image comprises over 260 thousand tonal values between two predetermined values, for example, between zero (0) and one (1). In instances where a relatively low number of knitted structures are utilized to design/fabricate the knitted component, the knitting system 100 may apply a threshold mechanism for resampling the grayscale values into a number consistent with the number of knitted structures that the designer or end user desires to include in the knitted component.

The knitting system 100 may assign one or more thresholds, of the threshold mechanism, a unique character and/or identifier. In some instances, design computer 102 may assign each threshold a unique character and/or identifier. In some embodiments, where the knitting system 100 evaluates knitted components comprising a single yarn of one color, the knitting system may automatically arrange the knitted structures of the knitted component by density. For example, the knitting system 100 may be configured to arrange the knitted structures from the most dense and/or opaque structure to the most loose and/or net-like structure. As such, the distribution of the knitted structures may correspond to the grayscale tone level of the image (or other input data), which may visually appear as a pixelated knitted component or fabric when manufactured by the knitting machine (e.g., the knitting machine 135). In other aspects of the present disclosure, the knitting system 100 may recommend to the designer or end user a suggestion or recommendation to range the knitted structures of the knitted component by density, for example, when the knitted component comprises a single yarn of one color.

Figures 5A, 5B:
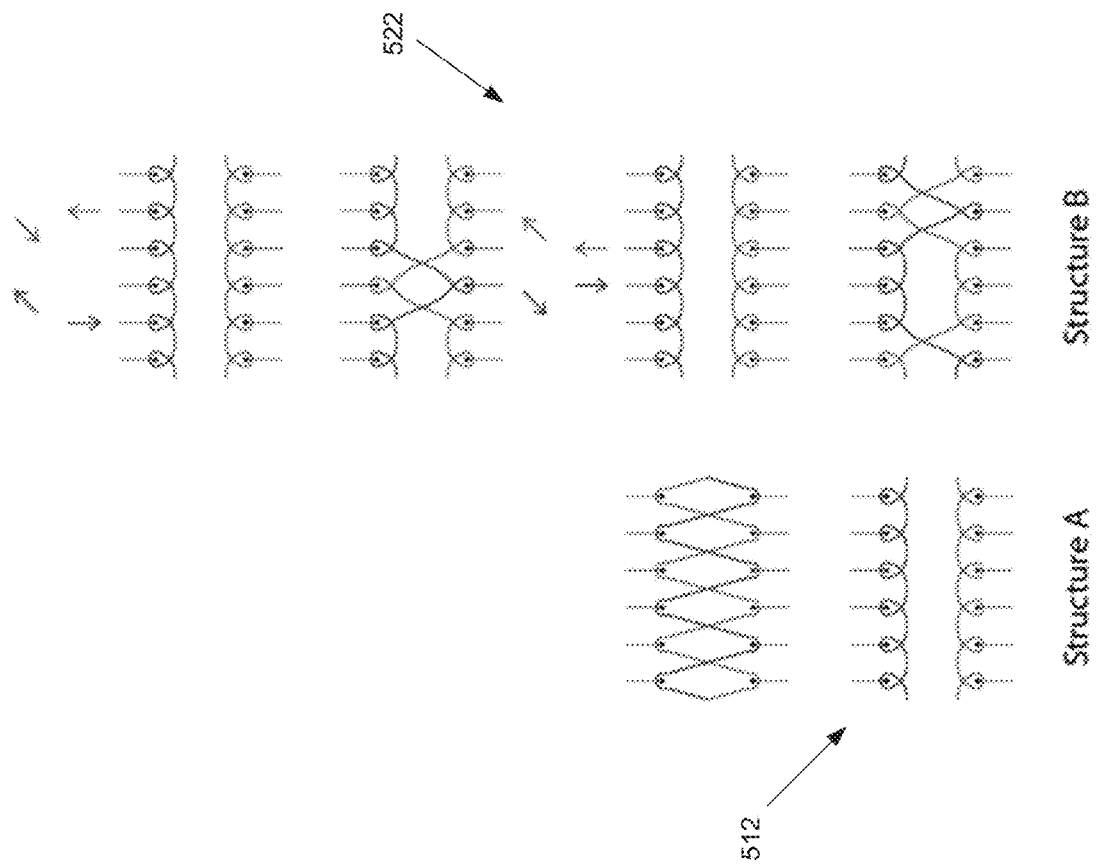
FIGS. 5A and 5B illustrate example matrix data structures and corresponding technical annotations and machine operations for the data structures, in accordance with one or more aspects of the present disclosure.

Referring back to the unique character matrix data array discussed above, the knitting system 100 may automatically translate this matrix data structure into a standard line-numbered Jacquard file format. For example, as shown in FIG. 3B, the matrix data structure (represented by element 334) may be translated into a separate file format, as represented by element 336. In some instances, a computation tool (e.g., computational tool 334) executed on the design computer 102, or other suitable computing device(s) of the knitting system 100, may translate the matrix data structure 331 into a Jacquard file format. In some instances, the translation of the matrix data structure may be performed by file generator 341. The Jacquard file, generated by the knitting system 100, is composed of an array of characters, which represent a two dimensional space containing the one or more knitting commands of any particular knitting task to be performed by the knitting machine 135. The rows of characters in this array may be presented in the order of operation for the knitting machine 135, which may perform the knitting from the bottom to the top, row by row, character by character as shown in the sequence depicted in FIG. 5A. In particular, FIG. 5A shows needle command notations for a sequence of 2 knit structures (Structure A—element 510, and Structure B—element 520), showing one cycle of each structure. As further shown in FIG. 5A, each character of the array defines an action/operation (e.g., knit construction) to be performed by the knitting machine 135, for example, the various knit constructions shown in FIG. 2. One or more needles of the knitting machine 135 may perform various operations, including, among others:

Tuck—an operation which adds a new yarn to a needle, either previously holding a loop or empty;

Knit—an operation that instructs the needle to draw a new yarn through a previous loop held by the needle, forming a new loop;

Miss or Float—an operation that instructs a needle not to operate, allowing the new yarn to pass laterally without getting caught.

Transfer—an operation that instructs a needle such that it passes the held loop(s) to an adjacent needle, which is either empty or already holding a loop (or loops). For certain knitting machines, passing a loop to a needle on the same needle bed may not be possible, and thus requires a two-step operation.

Split—an operation which combines a Knit operation and a Transfer operation into a single operation. The Split operation instructs the needle to knit through a loop onto the opposite needle bed, without losing hold the loop in the original knitting needle.

In some aspects of the present disclosure, the knitting machine commands/operations are doubled, in particular, the knitting system 100 may assign a different unique character for needles positioned on front beds and/or back beds of the knitting machine 135. As such, the machine-level control file (e.g., the Sintral file) continuously obtains and evaluates information from the Jacquard file regarding the location and the knitting commands of the matrix array.

FIG. 5B illustrates, via elements 512 and 522, the technical annotations corresponding to the machine operations respectively represented by matrix data Structure A (element 510) and matrix data Structure B (element 520) shown in FIG. 5A. These annotations represent standard technical stitch annotation, wherein each symbol may represent/indicate a single knitting stich performed by a particular knitting needle on the knitting machine. This manner of "illustrating" the knit fabric/component, via the technical annotations shown in FIG. 5B, may be used to communicate a particular knitted/fabric structure to the user, and further, to communicate such information when programming the knitting machine 135 to perform the intended fabrication/manufacturing of a knitted component. The drawings corresponding to elements 512 and 522 present a simplified top view of the two knitting beds (of the knitting machine 135) with the yarn line illustrating each needle action/operation. In particular, as noted above, the illustrations depicted in FIG. 5B shows one cycle of each knitted structure/pattern.

In fabricating the knitted component, the knitting system 100 may rely on identifying knitted "block" structures, rather than determining single needle operations. Thus, in some aspects of the present disclosure, the knitting system 100 may assign a linear array of needle command operations for each recurring knitted structure in the final knitted component. This is particularly relevant when the knitted structure(s) recur in a sequence. Accordingly, the knitting system 100 may parse one or more unique characters, of the matrix data structure, with a small array of needle command operations. For example, the design computer 102 may parse, via (Jacquard) file generator 341, every unique character of the matrix data structure with the small array of needle command operations.

Figure 5C:
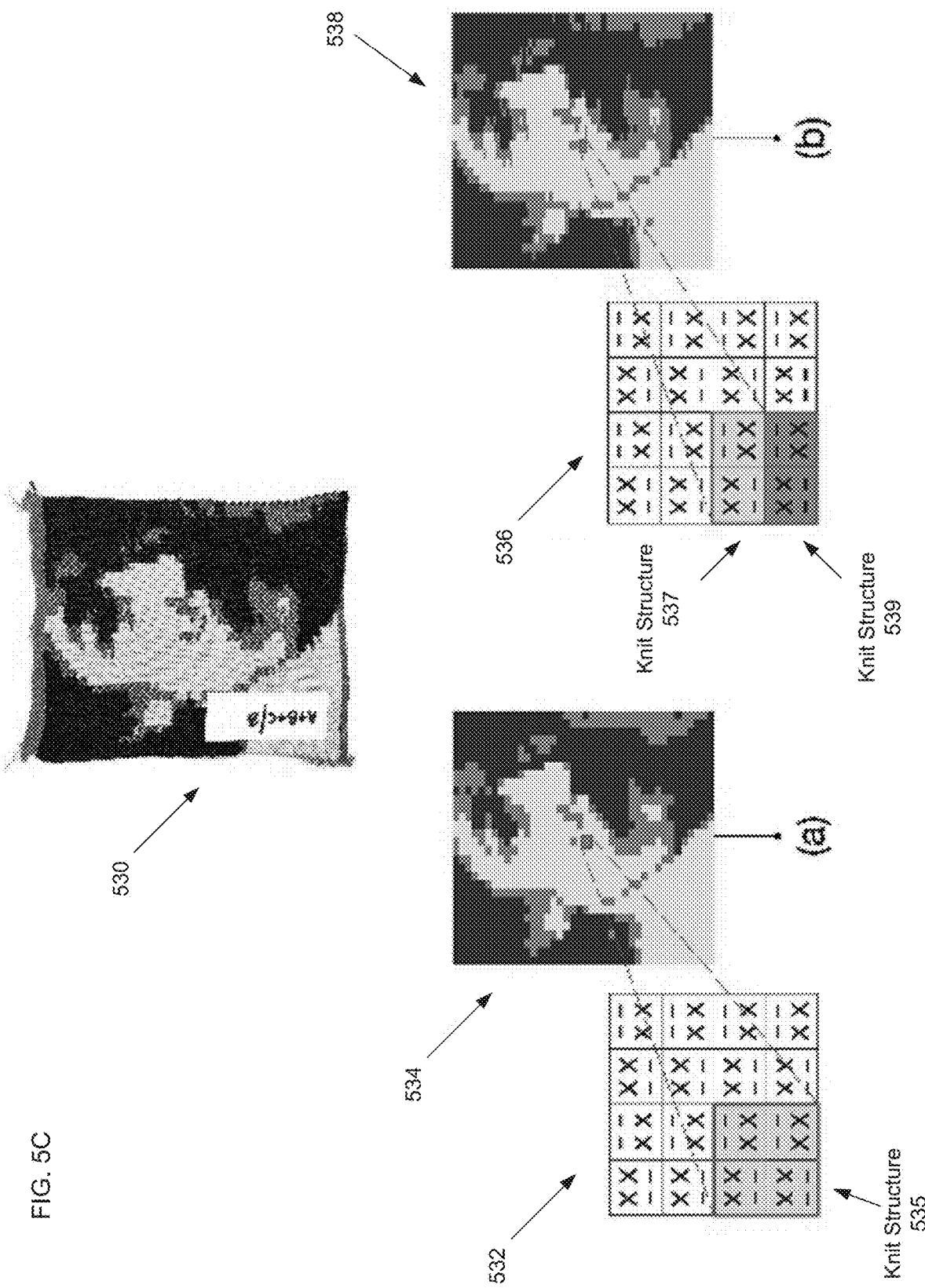
FIG. 5C illustrates examples of modified knit structures for improving a knit design example, in accordance with one or more aspects of the present disclosure.

The knitting system 100 may analyze the knitted patterns/structures and decompose them into minimum recurring "blocks." For example, as shown in FIG. 5C, element 532 represents an exemplary rendering of recurring blocks for a portion of knit design 534. In this example, the knit design may already comprise corresponding stitch structure data. This data may be originated, for example, from (i) an image and stitch allocation, or (ii) directly from either by a parametric formula or by the designer (user). One or more of these recurring blocks may consist of one or more needle operations. In some instances, each of the recurring blocks may consist of one or more needle operations. Given that different knitted structures with a different command operation logic may be combined into one output file, one or more matrix arrays might be different in dimensions. Therefore, in such instances, the knitting system 100 may utilize a common denominator for both width and length of each knitting array such that all combinations of knitted structures (or corresponding command logic) may eventually form a unified rectangular matrix at its borders, and thereby reduce and/or prevent distortion of the knitting pattern.

In other aspects of the present disclosure, to enhance the resolution of a particular/sample knitted component, the knitting system 100 may further decompose or "breakdown" the knitted patterns beyond their individual visual components by (i) disrupting a cycle of the recurring pattern and (ii) adding a smaller segment (or sub-block) of the original pattern to the knitted structure. For example, as shown in FIG. 5C, an additional breakdown of the knit design for a knitted component may be introduced, by the knitting system 100, to the width direction of the knitted component, thereby changing the resolution and the proportion of the image depicted on the face of the knitted component, resulting in a knitted component (e.g., knitted component 530) that includes a knit design with increased resolution. For example, referring to FIG. 5C, element 532 depicts an example of the recurring blocks comprising the one or more knitted structures for a portion of an original knit design, e.g., design 534. Element 532 includes a plurality of recurring cells, as well as a single knit structure (e.g., element 535) composed of a four-cell block of the knit pattern.

To improve the resolution of the design on the knitted component, as explained above, one or more computing devices of the knitting system 100 (e.g., consumer device 102) may analyze one or more portions of the knit design 534 to decompose or break down the knit structure 535 into smaller segments or sub-blocks, as shown by knit structures 537 and 539, which are composed of two-cell blocks having a rectangular shape in the width direction. As can be seen in the corresponding knit design 538 shown in FIG. 5C, the decomposition of knitted structures in the original design, in combination with the reassembly of portions of knitted structures to form new knitted structures, enables the knitting system to improve the resolution of an image/design of the final knit outcome, for example, the knitted component shown in FIG. 5C (e.g., element 530). This "breaking down" or decomposition process of the knitted structures of the knitted component, by the knitting system 100, and the subsequent reassembly of one or more portions of knitted structures/compositions with other fragments/portions of different knitted structures/compositions within the knitted component enables the knitting system 100 to generate new knitted structures/compositions based on the reassembly of varying portions of current knitted structures in the knitted component, thus creating new knitted structures and patterns in the knitted component altogether. In other words, the knitting system is taking into consideration what knitting stitches may or may not be next to each other according to known practice in the industry, and ensures that there are no conflicts in the current design/composition. Furthermore the knitting system reassemble stitches according to the designer/user and according to knitting "rules" or knitting machine limitations.

As explained above, the knitting system 100 may utilize a machine-level control file (Sintral) generator (e.g., file generator 342) to obtain, as input to the knitting machine, (i) a finalized Jacquard file, (ii) the length and width dimensions of the initial canvas/fabric/knitted component, (iii) the unified structure dimensions (common denominator for both directions), and (iv) knitting machine parameters. The knitting machine parameters may include various metrics associated with the knitting machine, such as total machine width, fabric takedown, knitting and transfer speed, and/or needle counters. These parameters, along with other machine information, may be stored in one or more computing devices in the knitting system, such as design computer 102 as depicted by element 343 of FIG. 3C. In some aspects of the present disclosure, the knitting system 100 stores this information, as parameters, into specific locations in machine code file template (e.g., Sintral file). This unconventional process of storing parameters into the machine code allows the end user or designer to have increased control when operating the knitting machine, and to dynamically alter the knitting performed by the machine between iterations. The knitting machine 135 may use the output from consumer design 102, such as the Sintral file, to manufacture the knitted component. Thus is illustrated in FIG. 3B by elements 336 and 338.

B. Visualization and Simulation of Fabric Behavior

As explained above, knitted fabrics have unique characteristics, specifically because of their long continuous inner-looped yarns, which may influence the overall behavior of the fabric. These characteristics may cause the knitted component to have nonlinear, three-dimensional kinematics.

The simulation mechanism utilized by the knitting system 100 to visualize the physical behavior of the knitted components takes, as input, the unique character dot matrix generated by the knitting system. Accordingly, given that there may be a particular quotient for each knit structure that is different than the expected square logic of the matrix array, the knitting system 100 is able to convert each cell in the initial matrix (as described, in part, above concerning the subdivision of rubrics) into a particular rectangular measurement. In some aspects of the present disclosure, prior to modeling the simulation, the knitting system 100 may obtain data indicating the dimensions of knitted samples, wherein the dimensions are measured in a relaxed condition of the knitted component or fabric. The knitting system 100 may utilize this data to determine, for each knitted structure, a unique aspect ratio that is particular and constant for that respective knitted structure.

Figure 5D:
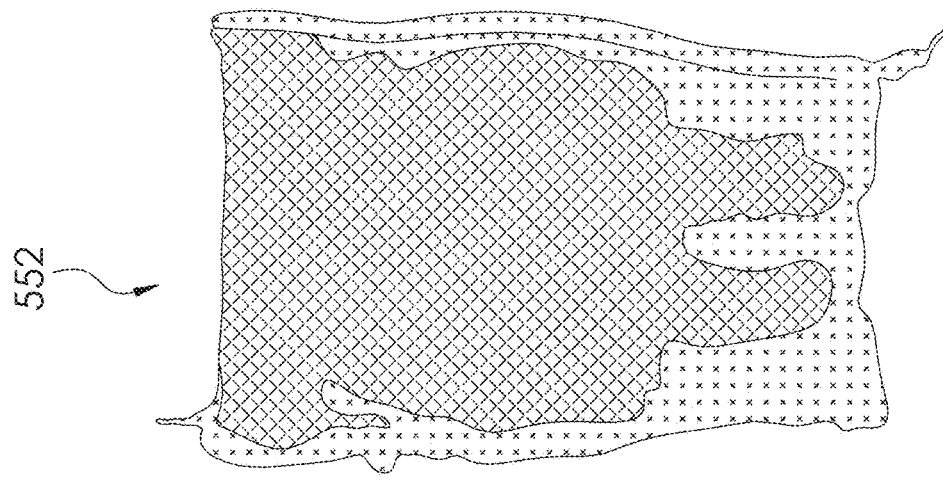
FIG. 5D illustrates an example spring-based simulation image, in accordance with one or more aspects of the present disclosure.
Figure 5D:
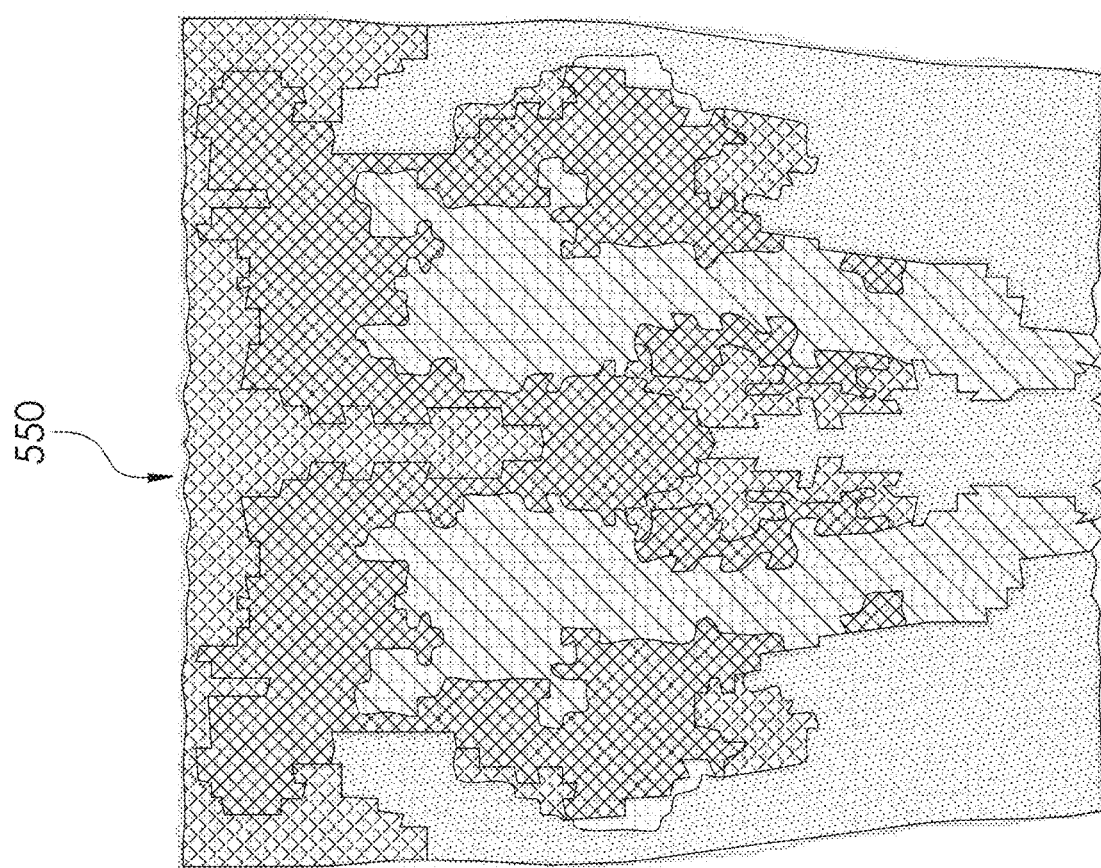

To simulate the inner forces that cause distortion of the knitted component, the knitting system 100 may use mesh edges (in the computational representations of the knitted component, e.g., CAD) to create a grid of simulated springs which physically simulates said forces. There are multiple ways in which the software tool may display geometric information, for example, in CAD or generally. As described herein a mesh edge (e.g., polygonal/pixel modeling) may be used to create the grid because in the translation of the mesh edge into a spring calculation, the system may need particular size information, which may be achieved through converting the non-uniform rational basis spline (NURB) surface, which represents common mathematical representations of 3D objects, into a mesh. Generally, when an object is scanned into a CAD program, they are initially scanned using NURBS. The respective length of each mesh edge is converted, by the knitting system 100, to a spring which follows Hooke's Law of elasticity. In some instances, this conversion may be performed by a computing device within the knitting system 100, such as spring engine 116. One or more computing devices of the knitting system 100, for example spring engine 116, may simulate the springs as force objects, and the entire mesh may be used by the knitting system 100 to visualize the overall geometry of the knitted component. The output of this simulation may comprise a new geometry of the knitted component that has been deformed by the springs, relative to an intended design for the component prior to the allocation of knitted structures which may cause the deformation. In some aspects of the present disclosure, the knitting system 100 and/or one or more computing devices therein (e.g., spring engine 116) may create a dynamic iterative simulation until the knitting system reaches equilibrium. FIG. 5D shows a still image from the visualization of a spring-based simulation for the knitted component (e.g., element 550) next to an image of the knitted component (e.g., element 552) that was fabricated. As shown in FIG. 5D, this exemplary test shows a correlation between the simulation image 550 and the deformation behavior of the knitted sample 552.

C. Compensation Methods for Knitted Component Designs

By integrating a physical engine simulation into the process of knitting design and knitting fabrication, the knitting system 100 enables the user to view the deformation behavior of the knitted component prior to initiating fabrication/manufacturing of the knitting component.

In some aspects of the present disclosure a first compensation method (e.g., a "Row Duplication" method) may be utilized by the knitting system 100 to enable the user to control the outline shape of the fabric or knitted component. This first compensation method is based on differential row duplication, and in some instances, may be the preferable method for knitted components comprising knit structures that differ in height. This compensation method includes selectively choosing in which areas of the knitted component and respective knit structures to duplicate rows in order to gain extra length, for example, in those areas which are found to be "shorter" in the simulation process. The machine code (Jacquard) generated by the knitting system 100 compensates for the height differences by strategically duplicating rows in the shorter knit structures. As explained herein, the machine code is generated by the system as the final knitting instructions to be sent to one or more knitting machines. As a result, the knitting system 100 may knit a different number of rows for different areas of knitting in one continuous process. This Row Duplication method may result in changes or modifications being made by the knitting system (e.g., design computer 102) to one or more Jacquard files. The Jacquard file may indicate and/or comprise a set of symbols used by the knitting machine to know what to knit in every needle at every row. As described here, the knitting system may modify and initial Jacquard file according to the compensation method, and the system may generate a new Jacquard file based on this modification.

In other aspects of the present disclosure a second compensation method (e.g., a "Stitch Density" method) may be utilized by the knitting system 100 to enable the designer or end user to control the outline shape of the knitted component. This second compensation method is based on automatically creating a new information layer for dynamically controlling stitch density of the knitted component. This stitch density information layer information represents another occurrence of the bitmap of the knitting area with individual stitch density information for each and every stitch (needle action) in the design, similar to a Jacquard file but with stitch density information. In some instances, the knitting machines may include an optional specific extension of the Jacquard file to include the stitch density information. By varying the stitch density of the knitted component, which can be numerically controlled in the knitting machine, the knitting system may control whether loops of the yarns, which are created by the knitting needles, are tightened or released. The knitting system 100 may automatically produce the initial new layer of information by duplicating the overall geometry of the knitted component and converting this information into stitch density values. As noted above, in some instances, this new layer of information may serve as a component or an extension of the Jacquard file. Accordingly, while the knitted component may not change its pattern/design appearance/knitted structures, the distribution of tightness within the knitted component may change. Thus, the knitting system 100 may produce individual stitch tightness mapping for each stitch in the pattern without changing the stitch structure and the overall design. In some instances, the knitting system 100 may modify the stitch density of the knitted component only in selected areas of the knitted component. Additionally, alterations to the stitch density of the knitted component may be stored, by the knitting system 100, in an additional file, similar to the Jacquard file, thereby presenting a new differential density matrix of values that define the stitch control of the knitting machine 135.

The rest length of the knitted component may be measured by the knitting system automatically. In some instances, the rest length measurement may be performed manually. Additionally or alternatively, the manually measured rest length may be compared to the automatic measurement for purposes of calibrating the automatic measurements. In some aspects of the present disclosure, rest length measurements may be used by the knitting system, such as by UI 115 or spring engine 116, as a parameter for defining a spring constant. For example, the system may determine rest length measurements by sampling a plurality of knitted components at rest. The system may normalize these values and store them in a suitable storage area. Table 1 below provides an example list of rest length measurements for the plurality of different knitted structures (e.g., Structures 1-7) shown in FIG. 5E:

TABLE I

Rest Length measurements (numbers are normalized and relative, based on sampling knitted components of singular knitted structures, at rest)

| Knitting Plan/ Structure | Measured Deformation (No Compensation) | | Stitch Density (Compensation Parameters) | |
|---|---|---|---|---|
| | height | width | height | width |
| Structure 1 | 1.000 | 1.400 | 1.000 | 1.400 |
| Structure 2 | 0.950 | 1.425 | 1.017 | 1.458 |
| Structure 3 | 0.950 | 1.450 | 1.017 | 1.483 |
| Structure 4 | 0.600 | 1.500 | 0.933 | 1.583 |
| Structure 5 | 1.000 | 1.250 | 1.000 | 1.250 |
| Structure 6 | 1.150 | 1.500 | 0.983 | 1.417 |
| Structure 7 | 1.000 | 1.500 | 1.000 | 1.500 |

Evaluation of the various compensation methods, including the "Row Duplication" and "Stitch Density" methods, may be measured and scored by the knitting system 100, using a mathematical model, such as the following:

$$\frac{a}{W_{max}} = AR \quad (1)$$

$$\frac{a'}{W'_{max}} ? = AR' \quad (2)$$

$$\frac{AR}{AR'} = ARR \quad (3)$$

As shown above in Equation (1), a first aspect ratio ("AR") may be measured, by the knitting system 100, by determining an initial area ("a") of the initial knit design shape, and dividing that value by a maximum width ($W_{max}$) of the knitted component. After the knitting system 100 implements a compensation method, such as the "Row Duplication" and "Stitch Density" methods discussed above (or a combination thereof), the knitting system 100 may determine a new area ("a'") and a new width ("$W_{max}$'") of the knitted component in order to calculate, using Equation (2), a second/updated aspect ratio of the design shape ("AR"). Using Equation (3), the knitting system may determine a quotient (i.e., "ARR" score) of the first and second aspect ratios. This quotient of aspect ratios between design intent and the simulation (ARR) will tend towards one (1) to the extent the two ratios are identical. The knitting system may also determine the difference in area ("ADR" score) between the initial area ("a") and the new area ("a'"). In some instances, the knitting system may determine an ADR score based on an area of deviation from the original knitting shape, and as such, the closer this ADR score is to zero (0), the more accurate the compensation.

These score values measured by the knitting system are utilized to shorten or reduce the iterative process of trial and error used in conventional systems. However, these scores still allow the knitting system to maintain the prototyping based creative workflow when new knitting prototypes are developed. When scaled up, this knitting system would continue to be relevant for the modification of knitting characteristics by end users, as opposed to experienced designers and knitters.

Additionally or alternatively, evaluation of compensation methods, such as the "Row Duplication" and "Stitch Density" methods, may be measured and scored by the knitting system 100, using the following mathematical model:

$$GAR = \frac{a}{(W_{max})^2} \quad (1)$$

In some instances, if Equation 1 of this model results in fractional values between the values of zero (0) and one (1), the system may determine, as shown in Equation (2) below, the reciprocal value the Equation so that all resulting values are greater than one (1).

$$\text{if}(GAR < 1) \text{ then}\left(GAR = \frac{1}{GAR}\right) \quad (2)$$

Referring back to Equation 1, the total area (a) of the initial design shape, is divided by the square of the maximum width ($W_{max}$)(squared) and a Geometrical Ratio (GAR) is measured. In the instance where the knitted component is in the shape of a square, the GAR value may equal (1) one. For other shapes, the GAR value may reflect a numerical ratio between the maximal width and the average length of the shape. After the knitting system implements a compensating strategy, the new area and width may be determined and compared to a template/sample knitted component, such as a knitted component having the shape of a perfect square. An additional geometrical deviation parameter may be determined by measuring the deviation of the deformed shape from the original shape—Area Difference Ratio (ADR)—the original and deformed shapes may be superimposed and each of the absolute differences in area between the two may be summed and normalized by the knitting system:

$$ADR = \frac{\sum |dif(a - a')|}{A} \quad (3)$$

As shown in Equation 3 (above), the dif(a–a') is the area difference against each of the original square edges and A is the original square area. Accordingly, an ADR score closer to (0) zero means that the shapes (e.g., the original shape and the shape of the knitted design that has had a compensation strategy applied thereto) resemble each other better, thus the compensation method is more accurate. Using these scores allow for shortening the iterative process of trial and error, yet maintaining the prototyping-based creative workflow and the overall approach towards research and development when new knitting prototypes are developed.

Figure 6A:
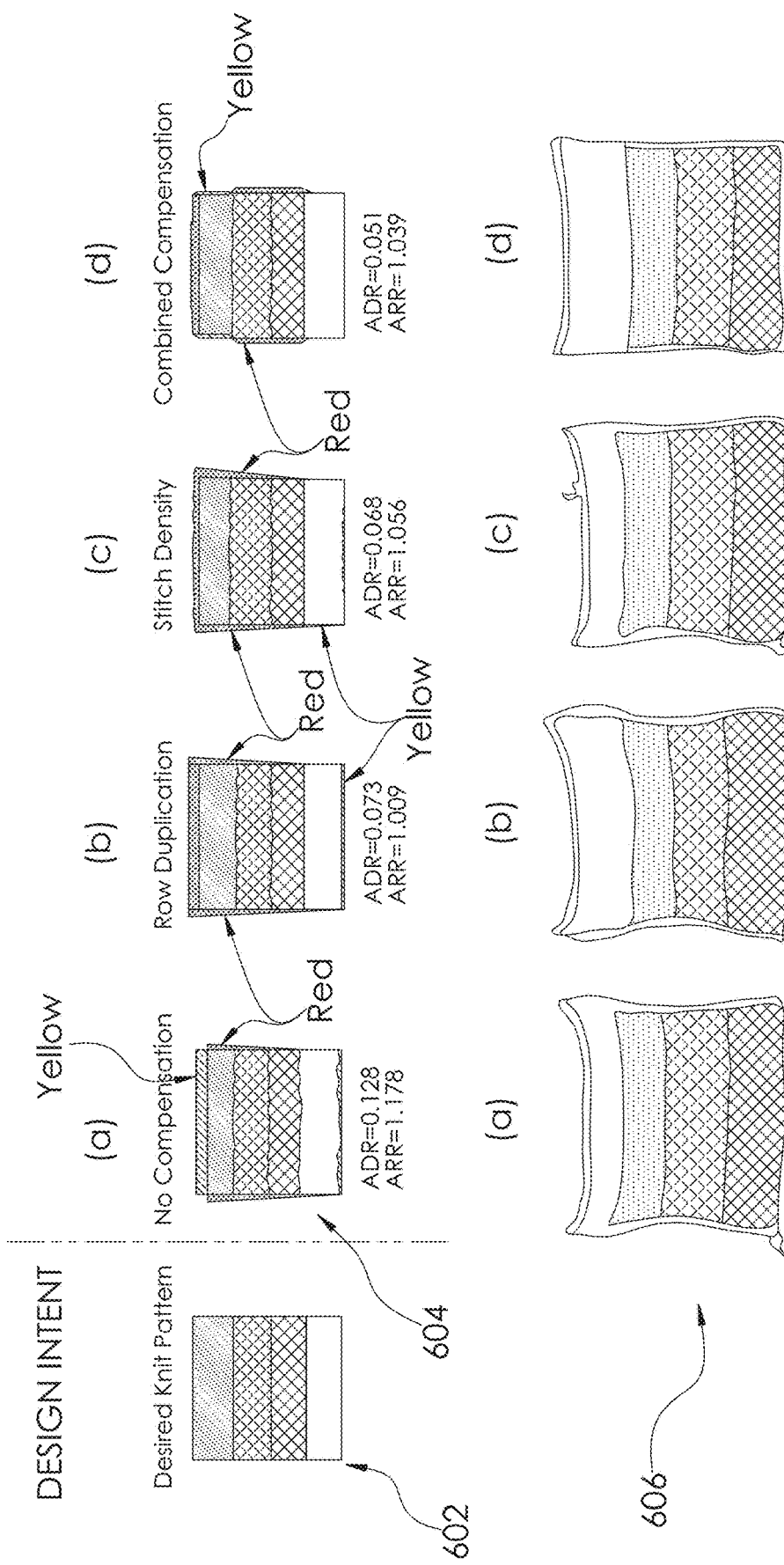
FIGS. 6A-F illustrate examples of different compensation methods for predicting deformation behavior in knitted components, in accordance with one or more aspects of the present disclosure.

FIG. 6A illustrates the different compensation methods utilized by the knitting system 100 to predict deformation behavior of knitted components prior to fabrication. For example desired knit pattern 602 represents a particular knit design to be fabricated by the knitting system 100. One or more computing devices of the knitting system 100, such as design computer 102, may determine evaluation scores (e.g., ADR and ARR scores) for one or more of the compensation methods performed in accordance with the knit pattern 602, as well as evaluation scores for the knit design without a compensation method being applied thereto. Additionally or alternatively, the design computer 102 may determine evaluation scores for the knit design 602 based on a combination of compensation methods.

As shown in FIG. 6A, element 604 shows modified knit designs that visually indicate the predicted deformation behavior of a knitted component prior to fabrication, while element 606 shows images of the corresponding knitted component that was actually manufactured by the knitting machine based on the applied compensation method. The deformation is determined based on allocating specific knit structures to the various portions of the knit pattern. In each portion of the knit pattern, a different knit structure is allocated, such that upon removal from the knitting machine and after some relaxation time it deforms into different sizes. For example, element 604A shows an image of the original knit design 602 that includes predicted areas of deformation (in red and yellow) and evaluation score values (e.g., ADR and ARR), as determined by the knitting system, without a compensation method being applied. As shown in FIGS. 6A-6E, the predicted areas of deformation may be color-coded (e.g. red and yellow). In the examples shown in FIGS. 6A-6E, the color yellow may indicate an area in the original (intended) design that is not present in the simulation, or in other words, shrinkage of the knitted component. Likewise, in these examples, the color red may indicate an area in the simulation that is not present in the intended design. Element 606A shows the resulting knitted component that was manufactured by a knitting machine, and as can be seen in FIG. 6A, the deformation behavior of the manufactured knitting component is consistent with the behavior predicted by the knitting system. As another example, element 604B shows an image of the original knit design 602 that includes predicted areas of deformation (in red and yellow) and evaluation score values (e.g., ADR and ARR), as determined by the knitting system, using a "Row Duplication" compensation method. Element 606B shows the resulting knitted component that was manufactured by a knitting machine, and as can be seen in FIG. 6A, the deformation behavior of the manufactured knitting component is consistent with the behavior predicted by the knitting system.

Figure 6B:
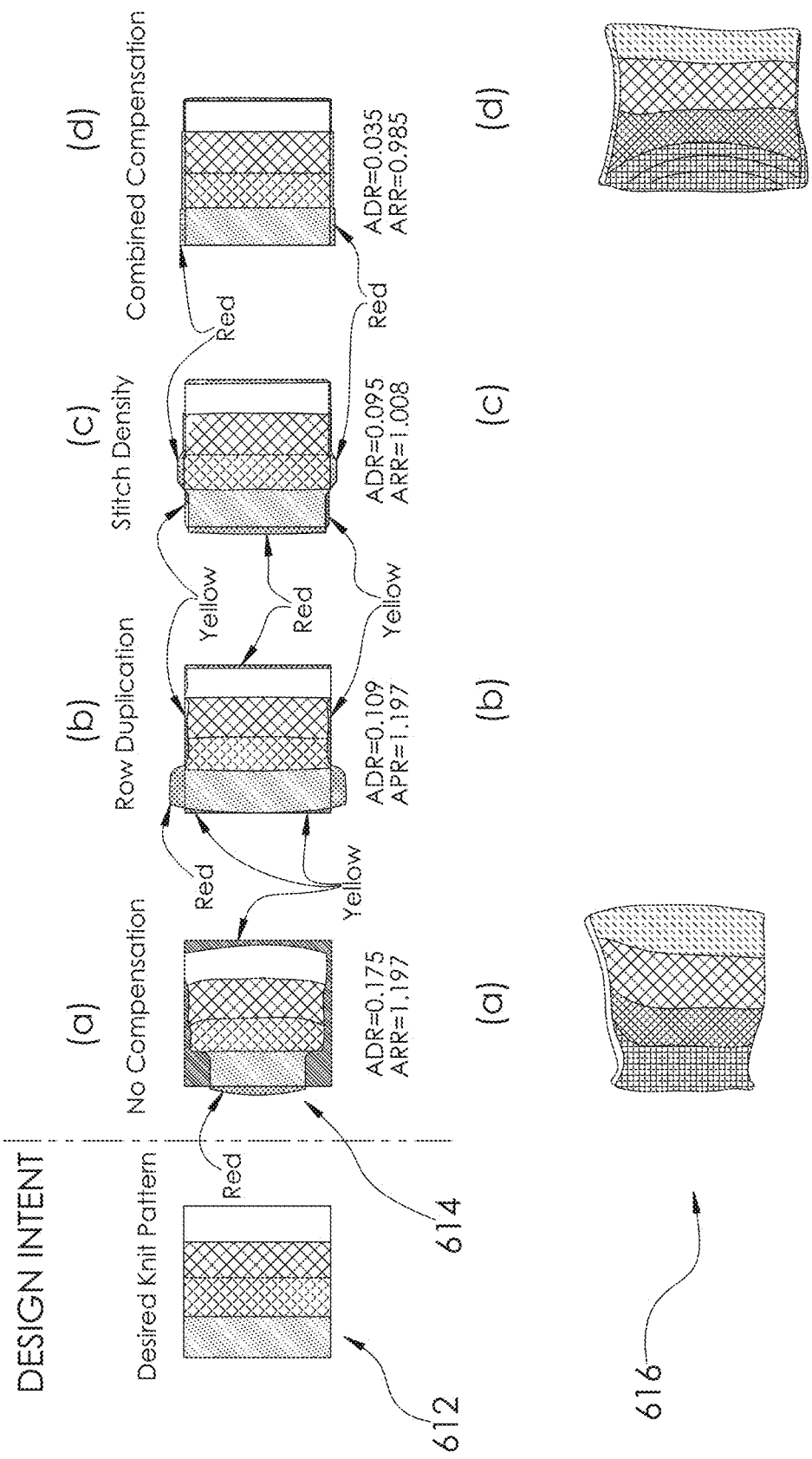
Figure 6C:
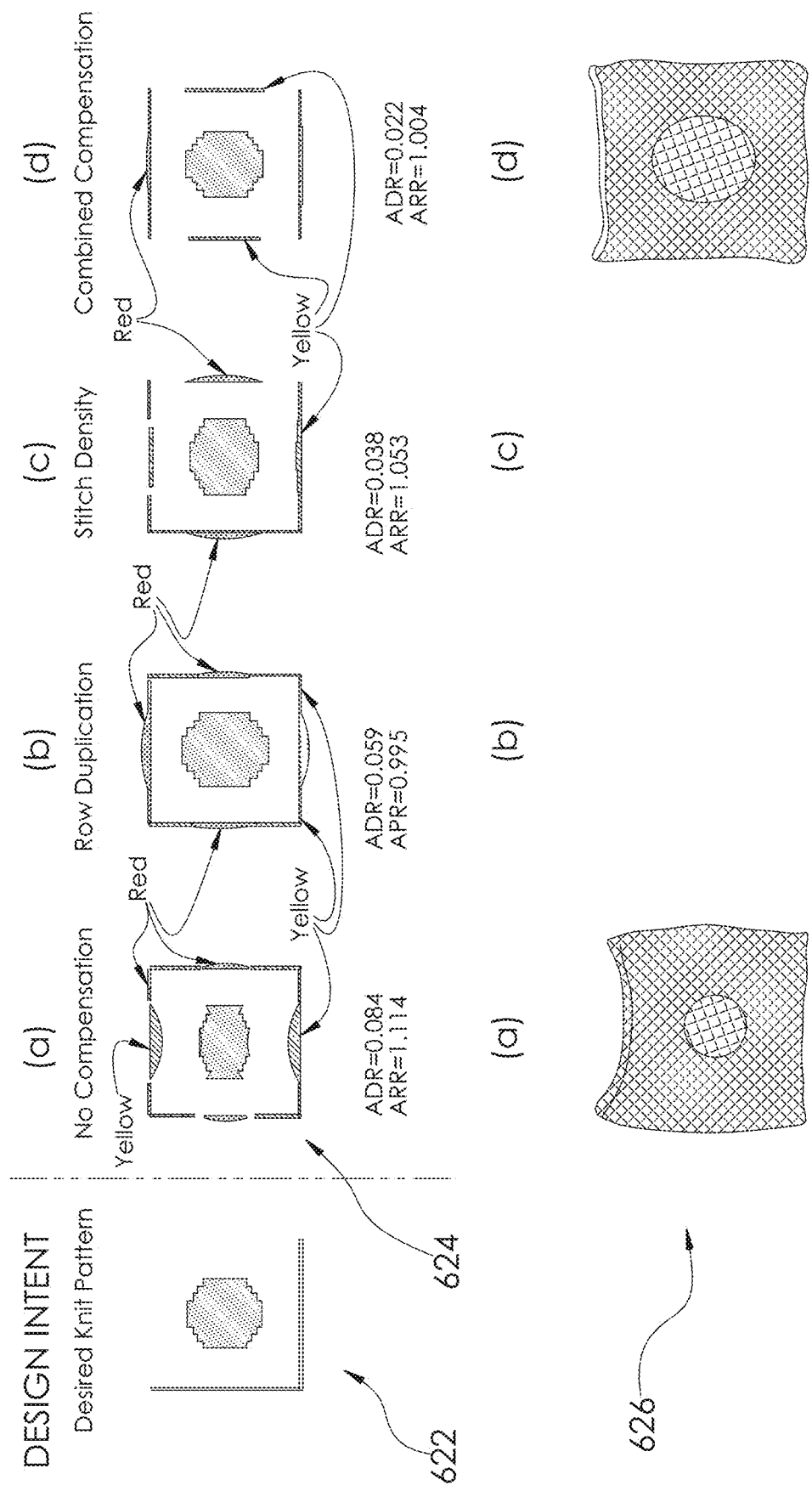
Figure 6D:
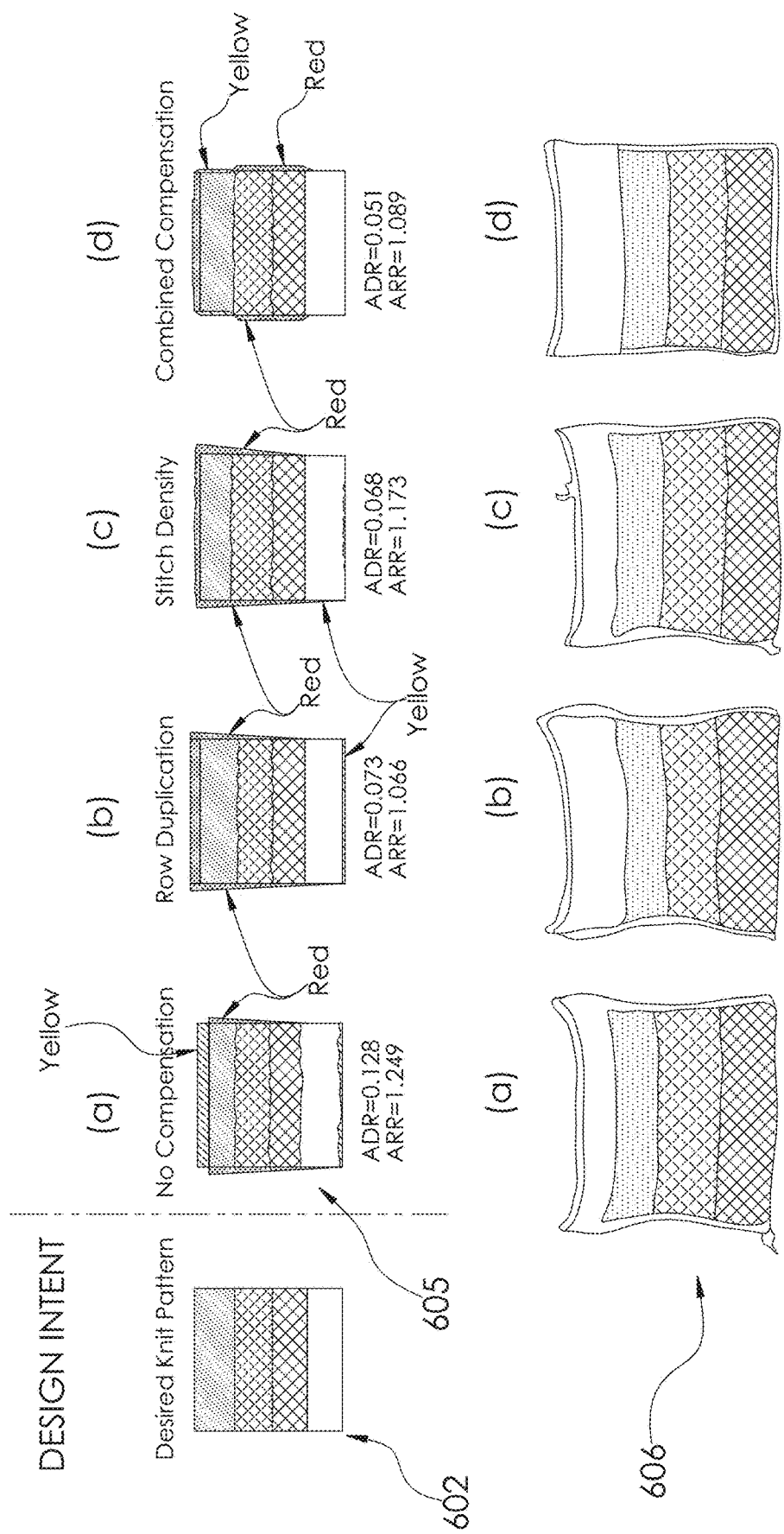

Referring now to the example in FIG. 6D, element 605A shows an image of the original knit design 602 that includes predicted areas of deformation (in red and yellow) and evaluation score values (e.g., ADR and GAR), as determined by the knitting system, without a compensation method being applied. Element 606A shows the resulting knitted component that was manufactured by a knitting machine, and as can be seen in FIG. 6D, the deformation behavior of the manufactured knitting component is consistent with the behavior predicted by the knitting system. As another example, element 605B shows an image of the original knit design 602 that includes predicted areas of deformation (in red and yellow) and evaluation score values (e.g., ADR and GAR), as determined by the knitting system, using a "Row Duplication" compensation method. Element 606B shows the resulting knitted component that was manufactured by a knitting machine, and as can be seen in FIG. 6D, the deformation behavior of the manufactured knitting component is consistent with the behavior predicted by the knitting system.

As yet another example, as shown in FIG. 6A, element 604C shows an image of the original knit design 602 that includes predicted areas of deformation (in red and yellow) and evaluation score values (e.g., ADR and ARR), as determined by the knitting system, using a "Stitch Density" compensation method. Element 606C shows the resulting knitted component that was manufactured by a knitting machine using the said stitch density compensation, and as can be seen in FIG. 6A, the deformation behavior of the manufactured knitting component is consistent with the behavior predicted by the knitting system. As still another example, element 604D shows an image of the original knit design 602 that includes predicted areas of deformation (in red and yellow) and evaluation score values (e.g., ADR and ARR), as determined by the knitting system, using a combination of the Row Duplication and Stitch Density compensation methods. Element 604D shows the resulting knitted component that was manufactured by a knitting machine, and as can be seen in FIG. 6A, the deformation behavior of the manufactured knitting component is consistent with the behavior predicted by the knitting system.

FIGS. 6B and 6C illustrate additional examples of the different compensation methods utilized by the knitting system 100 to predict deformation behavior of knitted components having different knit designs (e.g., knit designs 612 and 622).

Figure 6E:
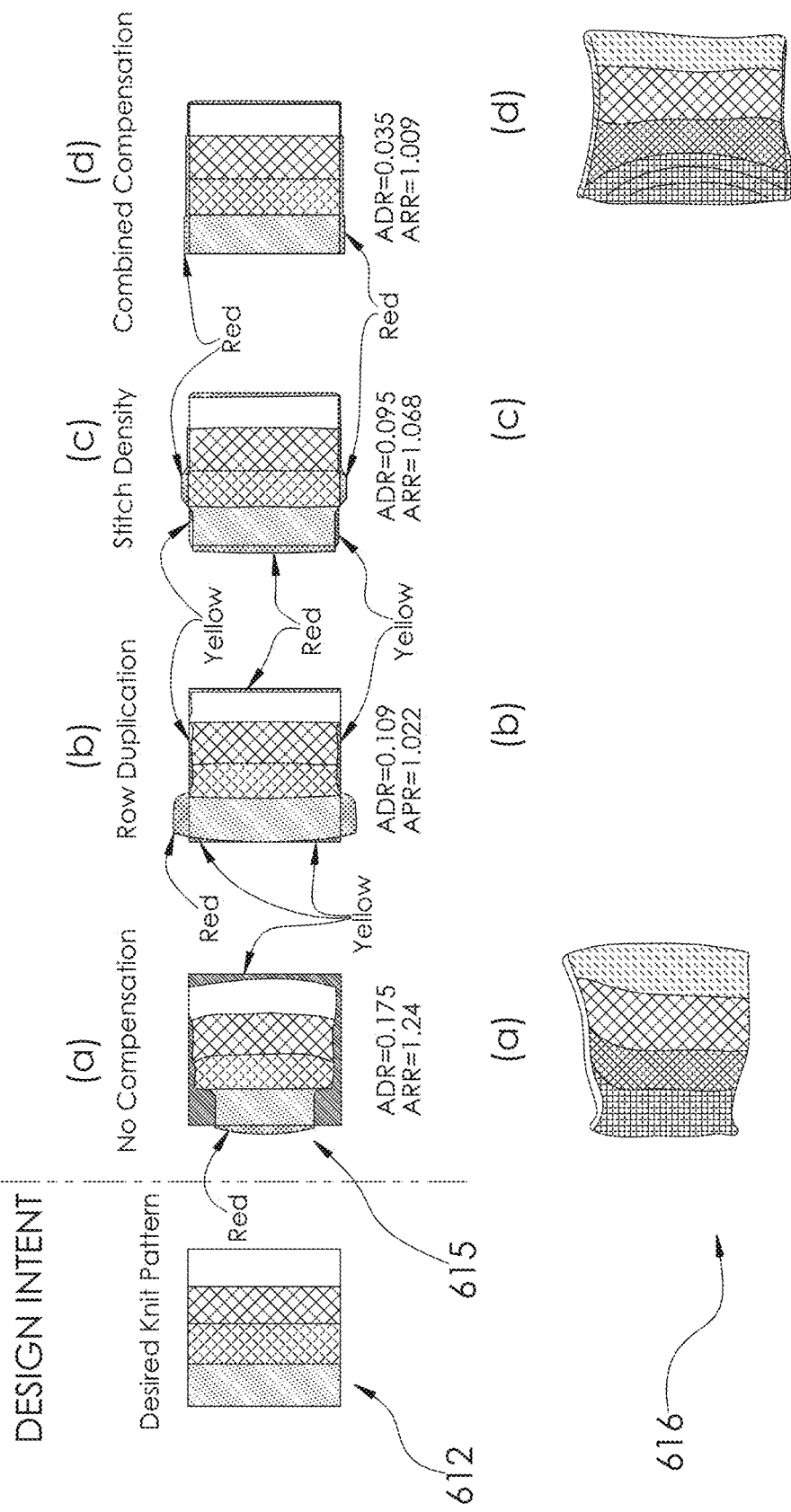
Figure 6F:
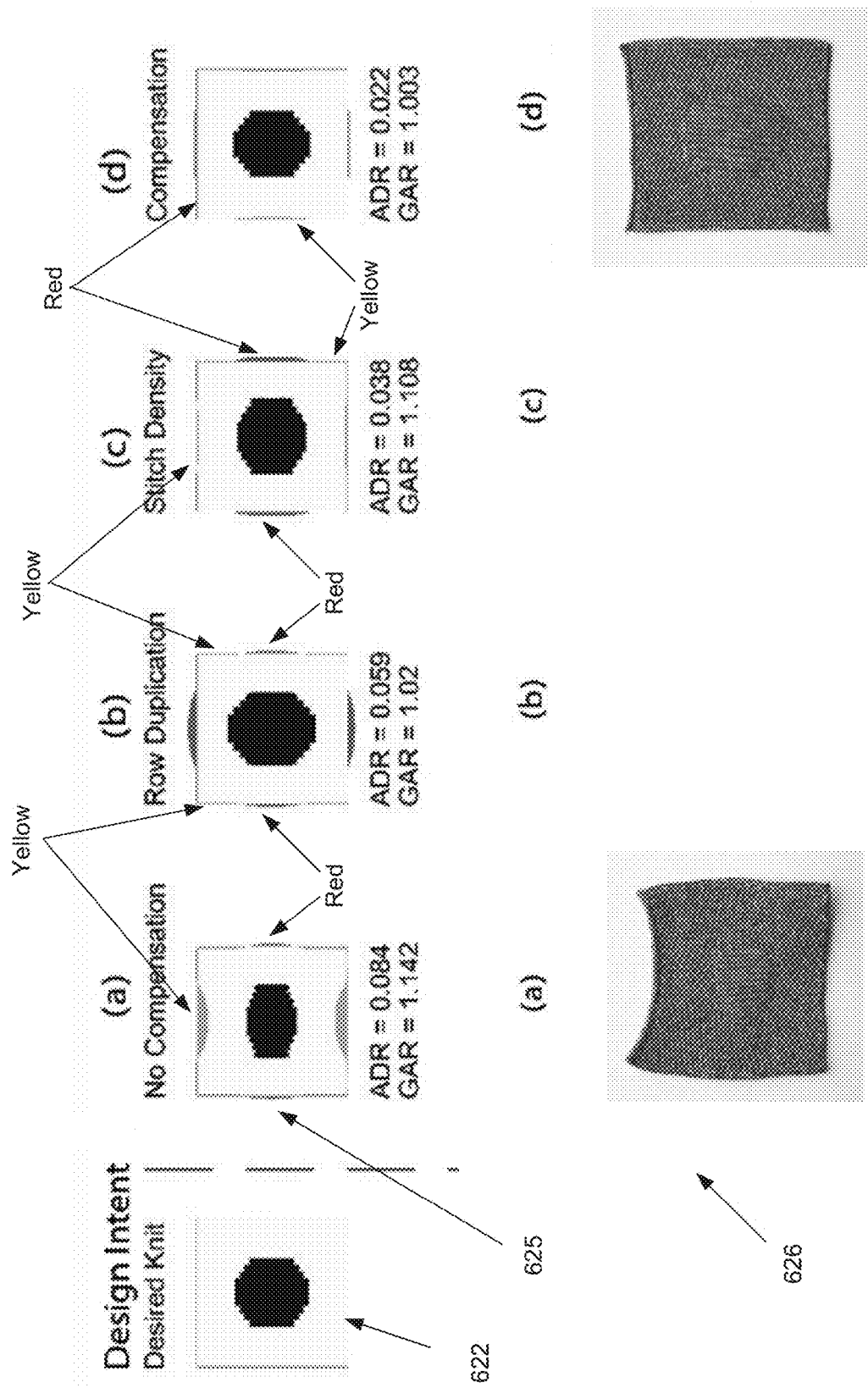

FIGS. 6E and 6F illustrate additional examples of the different compensation methods utilized by the knitting system 100 to predict deformation behavior of knitted components having different knit designs (e.g., knit designs 612 and 622).

One or more computing devices of the knitting system 100 may be configured to generate new knitted patterns. For example, consumer device 102 (or a computational tool executed therein—design tool 333) may be configured to generate a new knitted patterns. The knitting system 100 may generate a new knitted pattern by (i) identifying knitted structures within a knitted component (or knit design), (ii) "breaking down" these knitted structures into small repeatable assemblies, and (iii) recombining these fragmented parts (or sub-blocks) into new and potentially unpredictable knitted structures/patterns. This approach for generating new knitted structures/patterns is similar to the process, explained above, for refining or improving the resolution of a knit design pattern by making them more responsive in terms of knitted structure distribution and design potential. By creating additional ways in which the knitting system 100 may dissect/decompose knitted structures into the smallest repetitive pattern of the highest resolution also includes developing a model for a smooth transition between different structures using different structure characteristics such as transparency, density and texture.

Importantly, an objective of the present knitting system is to enable engagement with the end user(s) who will be able to participate in the knit design process in a smooth and automated manner. In some aspects of the present disclosure, the knitting system 100 may use the process of generative pattern-making, described herein, to create knits that are derived from various types of input data, such as real user-based data. For example, the knitting system 100 may generate sensor-driven knitting information to fabricate knitted components. Other types of information, such as data provided by end users reflecting their preferences and demand for better performance, may also be utilized during the knitting process described above.

Figure 7:
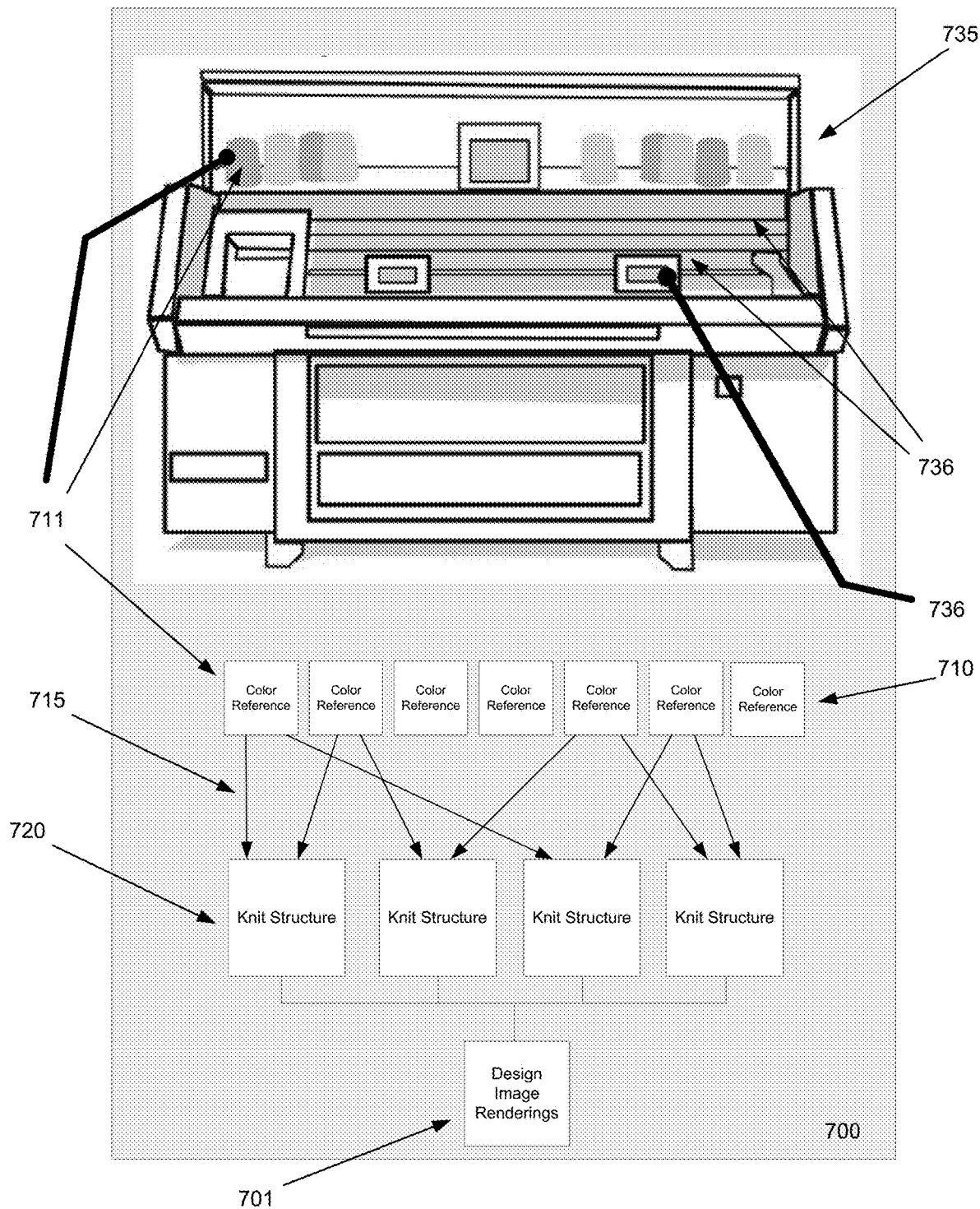
FIG. 7 illustrates an example interface for designing knitted components, in accordance with one or more aspects of the present disclosure.

FIG. 7 illustrates an example interface for modifying a knit design in accordance with one or more aspects of the present disclosure. User interface 700 includes a knitting machine image 735, a palette of color references 710, one or more color vectors (e.g., vector 715), portions of the interface representing knit structures (e.g., knit structure 720), and a display portion 701 illustrating renderings of the knit design. User interface 700 may display animations illustrating the various design choices and selections made by a user during the design process. As will be appreciated, the components of user interface 700 may include the same or similar features and functions of corresponding components provided by the user interface 115.

As another example, knit structure 720 may include the same or similar features and/or compositions as the knit structures described herein. For instance, while not shown in FIG. 7, knit structure 720 may include (or display) information associated with the knit structure, such as the underlying knit composition or recurring blocks that comprise the knit structure. In some instances, a user may draw a color vector 715 in user interface 700 to associate (or assign) a particular color value (e.g., yarn/material color) to a particular knit structure. After the color vector has been drawn or modified, user interface 700 may graphically illustrate a material (such as yarn from the one or more spools associated with the selected color value) being arranged in one or more portions of knitting machine image 735, as illustrated by element 736.

Knitting machine image 735 in user interface 700 may serve as a graphic representation of a knitting machine (e.g., knitting machine 135) used to manufacture knit products (e.g., a knit footwear upper). Material, such as material 130, used by the knitting machine 135 to manufacture a knit product 140 may be graphically represented in knitting machine image 735. For example, as illustrated by element 710, each color or color reference selected by a user may be graphically represented by one or more spools of yarn (or some other material) in knitting machine image 735.

As the user selects and/or modifies various design choices, these choices may be reflected (e.g., graphically represented or simulated) in real-time via the knitting machine image 735 or other portions of interface 700. For example, changes made to the color value of color reference 710 may be reflected in knitting machine image 735 by changing the color of one or more spools of yarn to correspond to the new color value. As another example, the number of colors that may be used for a particular design may be graphically represented by the number of spools in knitting machine image 735. In this example, an empty spool may represent an undefined or available color reference that may be added to the color palette.

As will be appreciated, the user's design choices may be limited based on limitations associated with the knit design, such as availability of materials, structural rules, and physical limitations of a knitting machine. For example, due to limitations in the supply of certain materials used to manufacture a knit product, a user may be provided with a limited number of color choices that correspond to the availability or supply of those materials (e.g., yarn). Thus, when user selects color reference 711, the user may be provided with a listing of color options that correspond to the materials that are currently in supply. As another example, due to the structural or physical limitations of a knitting machine, a user may be limited in the number of color options that may be assigned to a particular knit structure. For instance, if a knitting machine, such as knitting machine 135, has a predetermined number of "feeders," a user may be limited to the number of color combinations or the number of colors that may be assigned to knit structures based on the number of feeders in the knit machine.

Figure 8:
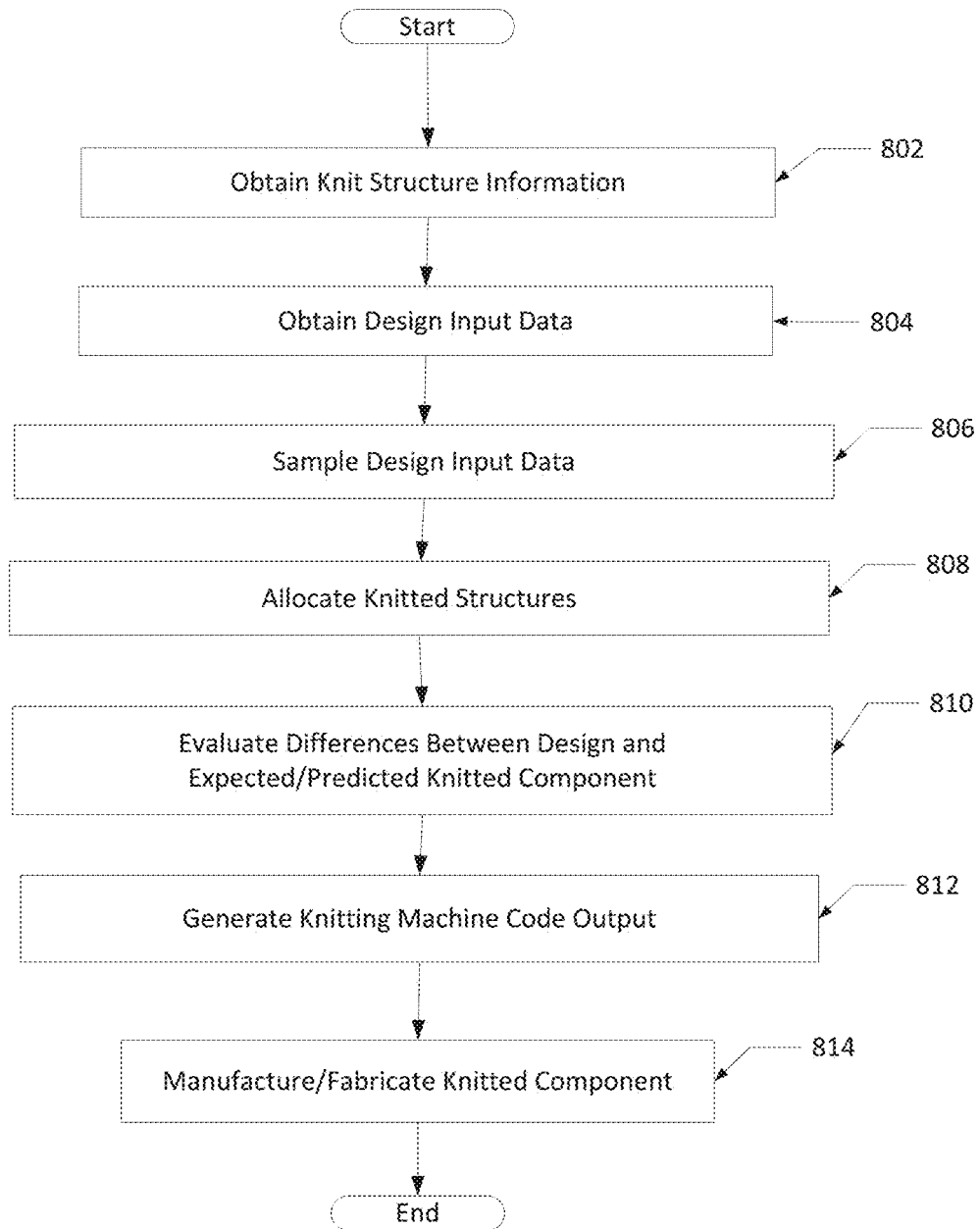
FIG. 8 illustrates a method for designing knitted components, in accordance with one or more aspects of the present disclosure.

FIG. 8 illustrates a method of designing and manufacturing a knitted component, in accordance with one or more aspects of the present disclosure. The steps identified in FIG. 8 may be performed with a system such as the knitting system 100 shown in FIG. 1.

First, in step 802, the knitting system obtains knit structure information. The system may obtain the knit structure information from one or more computing devices and/or a suitable storage area, such as library 117. Additionally or alternatively, the knitting system may obtain a portion (or all) of the knit structure information by analyzing one or more knit samples/components.

In step 804, the knitting system obtains design input data. The system may use the design input data to manufacture a knitted component having a graphic design corresponding to an image associated with the obtained design input data. The input data may comprise a data file, such as a raster image. The input data may identify various visual and physical attributes (e.g., features) associated with a knit design. In some embodiments, a user may select a knit design from a plurality of knit designs stored by the system.

Next, in step 806, the knitting system samples the design input data, for example, the input data obtained during step 804. The knitting system may use a user interface, such as UI 115, to sample the input data. The user interface may include and/or obtain from one or more other computing devices of the knitting system allocation logic, allowing the user to flexibly control the design of the knitted component, and in step 808, the knitting system may allocate knitted structures for the knitted component to be manufactured. At step 808, the knitting system uses input provided by the end user/designer to allocate the knitted structures. In some embodiments, the system may distribute different knitted structures for the knitted component with relation to a particular data input or file, such as the input data obtained during step 804. The distribution of knitted structures may be performed based on sampling of grayscale tones and/or other input data at step 806.

At step 810, the knitting system evaluates differences between the knit design and a predicted/determined knitted component. As described herein, the system may implement a physical simulation of an estimated deformation of the knitted component, which allows the system to dynamically add compensations, based on different methods, to achieve a better prediction for the final knitted outcome and physical output of the knitting machine, e.g., one in which the outline of the output more closely resembles the outline according to the original knit design, as compared with the intended design. The knitting system may evaluate differences between the knit design and a predicted/determined knitted component based on the allocated knitted structures. At step 810, the system may simulate, based on a physical spring-based compensation analysis, the deformation of the knitted component under a resting condition. The knitting system may automatically determine redistribution forces in the knitted component/fabric to compensate for the physical deformation. The knitting system may comprise a dynamic system that simulates forces between elements and deforms those elements accordingly. After the initial deformation is calculated, further calculations may be performed to determine new deformations until an equilibrium is achieved. At step 810, the system may evaluate the determined differences using one or more evaluation scores.

At step 812, the knitting system generates and/or outputs machine code and/or data files for operating a knitting machine. In some aspects of the present disclosure, the knitting system may include a compiler, such as the compiler 108, for generating and/or outputting machine code and/or data files to the knitting machine 135.

At step 812, the system may utilize a file generator (e.g., file generator 342) to generate a data file, such as a Sintral file, for controlling the knitting machine. The knitting system may generate the data file based on various input, such as a Jacquard file, length and width dimensions of the initial knitted component, unified structure dimensions, and knitting machine parameters. At step 814, the knitting system may manufacture or fabricate the knitted component. The one or more knitting machines of the knitting system may manufacture/fabricate the knitted component based on instructions or machine code output generated at step 812.

While the present disclosure has been described with respect to specific examples including presently preferred modes of carrying out aspects of the present disclosure, those skilled in the art will appreciate that numerous variations and permutations of the above described systems and techniques may be made without departing from the present disclosure. For example, the systems, methods, and/or user interfaces may include more, less, and/or different functionality from that described above, and the various features of the systems, methods, and/or user interfaces may be activated or interacted with in various different manners (e.g., using different types of interface elements) from those described above. Also the various process steps may be changed, changed in order, some omitted, and/or include additional steps or features without departing from the present disclosure. Various changes and modifications to the systems, methods, and user interfaces may be made without departing from the spirit and scope of the present disclosure, as set forth in the appended claims.

Hereinafter, various characteristics will be highlighted in a set of numbered clauses or paragraphs. These characteristics are not to be interpreted as being limiting on the invention or inventive concept, but are provided merely as a highlighting of some characteristics as described herein, without suggesting a particular order of importance or relevancy of such characteristics.

Clause 1: A method, comprising: obtaining, by a computing device, a first set of knit structure information; obtaining, by the computing device, design input data; allocating, based on the design input data and the knit structure information, one or more knitted structures to a knit design; generating, by the computing device and based on the knit design, one or more output files indicating a plurality of knitting instructions; and sending the one or more output files to a knitting machine for manufacturing a knitted component.

Clause 2: The method of clause 1, wherein the design input data comprises a raster image.

Clause 3: The method of clause 1 or 2, wherein the design input data comprises at least one of a set of visual attributes and a set of physical attributes associated with the knit design.

Clause 4: The method of any preceding clause, further comprising: sampling, by the computing device, a plurality of grayscale images associated with the design input data.

Clause 5: The method of any preceding clause, wherein the allocation of the one or more knitted structures to the knit design is based on a grayscale tone level associated with the design input data.

Clause 6: The method of any preceding clause, wherein the allocating the one or more knitted structures further comprises: receiving, via a user interface, user input selections for allocating the one or more knitted structures.

Clause 7: The method of any preceding clause, further comprising: determining, by the computing device and based on an intended knit design, a deformation of the knitted component corresponding to the knit design.

Clause 8: The method of clause 7, further comprising: displaying, by the computing device, the deformation of the knitted component; determining, by the computing device and based on one or more compensation routines, a plurality of predicted compensation results corresponding to the knit design; and applying one or more redistribution forces in the knitted component, based on the predicted compensation results, to compensate for the determined deformation.

Clause 9: The method of any preceding clause, further comprising: generating, by the computing device and based on the knit design, a matrix data structure indicating a plurality of knitting instructions for a knitting machine.

Clause 10: A non-transitory machine readable medium storing instructions that, when executed, cause a computing device to: obtain a first set of knit structure information; obtain design input data; allocate, based on the design input data and the knit structure information, one or more knitted structures to a knit design; generate, based on the knit design, one or more output files indicating a plurality of knitting instructions; and send the one or more output files to a knitting machine for manufacturing a knitted component.

Clause 11: The non-transitory machine readable medium of clause 11, wherein the design input data comprises a raster image.

Clause 12: The non-transitory machine readable medium of clause 10 or 11, wherein the design input data comprises at least one of a set of visual attributes or a set of physical attributes associated with the knit design.

Clause 13: The non-transitory machine readable medium of any of clauses 10 to 12, wherein the allocation of the one or more knitted structures in the knit design corresponds to a grayscale tone level associated with the design input data.

Clause 14: The non-transitory machine readable medium of any of clauses 10 to 13, wherein the instructions, when executed, further cause the computing device to: determine a deformation of the knitted component corresponding to the knit design.

Clause 15: The non-transitory machine readable medium of claim 14, wherein the instructions, when executed, further cause the computing device to: display the deformation of the knitted component; determine, based on one or more compensation routines, a plurality of predicted compensation results corresponding to the knit design; and apply one or more redistribution forces in the knitted component, based on the predicted compensation results, to compensate for the determined deformation.

Clause 16: The non-transitory machine readable medium of any of clauses 10-15, wherein the instructions, when executed, further cause the computing device to: generate, based on the knit design, a matrix data structure indicating a plurality of knitting instructions for a knitting machine.

Clause 17: An apparatus comprising: one or more processors; and memory storing instructions that, when executed, cause the apparatus to: obtain a first set of knit structure information; obtain design input data; allocate, based on the design input data and the knit structure information, one or more knitted structures to a knit design; generate, based on the knit design, one or more output files indicating a plurality of knitting instructions; and send the one or more output files to a knitting machine for manufacturing a knitted component.

Clause 18: The apparatus of clause 17, wherein the instructions, when executed, further cause the apparatus to: determine a deformation of the knitted component corresponding to the knit design.

Clause 19: The apparatus of clause 18, wherein the instructions, when executed, further cause the apparatus to: display the deformation of the knitted component; determine, based on one or more compensation routines, a plurality of predicted compensation results corresponding to the knit design; and apply one or more redistribution forces in the knitted component, based on the predicted compensation results, to compensate for the determined deformation.

Clause 20: The apparatus of any of clauses 17 to 19, wherein the instructions, when executed, further cause the apparatus to: generate, based on the knit design, a matrix data structure indicating a plurality of knitting instructions for a knitting machine.

The invention claimed is:

1. A method, comprising:
predicting, by a computing device and based on a simulation model for a plurality of knit structures of a knit design, a deformation of a knit structure of the plurality of knit structures;
modifying, by the computing device, the knit design to compensate for the deformation associated with the knit design, wherein the modifying comprises duplicating one or more portions of the knit structure; and
sending, to a knitting machine, knitting instructions associated with the modified knit design.

2. The method of claim 1, further comprising:
generating, by the computing device and prior to fabricating a knitted component associated with the knit design, a visual representation of the deformation associated with the knit design.

3. The method of claim 1, wherein the deformation comprises a deformation of a knitted component, associated with the knit design, under a resting condition-.

4. The method of claim 1, further comprising:
determining, by the computing device, an allocation of the plurality of knit structures of the knit design.

5. The method of claim 4, wherein the determining of the allocation of the plurality of knit structures further comprises:
generating, by the computing device, a data structure indicating the knitting instructions for the knitting machine; and
distributing, to the data structure, a plurality of rubrics associated with the plurality of knit structures.

6. The method of claim 1, wherein the modifying of the knit design further comprises:
determining, based on one or more compensation routines, a plurality of predicted compensation results corresponding to the knit design; and
determining, based on scores associated with the plurality of predicted compensation results, a compensation routine, of the one or more compensation routines, to compensate for the deformation.

7. The method of claim 1, further comprising:
determining first aspect ratios associated with the knit structures;
determining, via one or more compensation routines, one or more other knit structures, of the plurality of knit structures, of the knit design; and
determining scores for the knit structures, based on a comparison of the first aspect ratios and second aspect ratios, wherein the second aspect ratios are associated with the one or more other knit structures.

8. The method of claim 1, wherein the modifying of the knit design further comprises adjusting a stitch density associated with one or more knit structures, of the plurality of knit structures, of the knit design.

9. An apparatus comprising:
one or more processors; and
memory storing instructions that, when executed, cause the apparatus to:
predict, based on a simulation model for a plurality of knit structures of a knit design, a deformation of a knit structure of the plurality of knit structures;
modify the knit design to compensate for the deformation associated with the knit design, wherein the modifying comprises duplicating one or more portions of the knit structure; and
send, to a knitting machine, knitting instructions associated with the modified knit design.

10. The apparatus of claim 9, wherein the instructions, when executed, further cause the apparatus to:
generate, prior to fabricating a knitted component associated with the knit design, a visual representation of the deformation associated with the knit design.

11. The apparatus of claim 9, wherein the instructions, when executed, further cause the apparatus to determine an allocation of the plurality of knit structures of the knit design by:
generating a data structure indicating the knitting instructions for the knitting machine; and
distributing, to the data structure, a plurality of rubrics associated with the plurality of knit structures.

12. The apparatus of claim 9, wherein the instructions, when executed, further cause the apparatus to:
receive design input data indicating at least one of a set of visual attributes and a set of physical attributes associated with the knit design.

13. The apparatus of claim 9, wherein the instructions, when executed, further cause the apparatus to modify the knit design by:
adjusting a stitch density associated with one or more knit structures, of the plurality of knit structures, of the knit design.

14. A non-transitory machine readable medium storing instructions that, when executed, cause a computing device to:
predict, based on a simulation model for a plurality of knit structures of a knit design, a deformation of a knit structure of the plurality of knit structures;
modify the knit design to compensate for the deformation associated with the knit design, wherein the modifying comprises duplicating one or more portions of the knit structure; and
send, to a knitting machine, knitting instructions associated with the modified knit design.

15. The non-transitory machine readable medium of claim 14, wherein the instructions, when executed, further cause the computing device to:
generate, prior to fabricating a knitted component associated with the knit design, a visual representation of the deformation associated with the knit design.

16. The non-transitory machine readable medium of claim 14, wherein the instructions, when executed, further cause the computing device to:
obtain, from a database storing the plurality of knit structures, the knit structure of the plurality of knit structures.

17. The non-transitory machine readable medium of claim 14, wherein the instructions, when executed, further cause the computing device to modify the knit design by:
   adjusting a stitch density associated with the plurality of knit structures of the knit design.

\* \* \* \* \*